(12) United States Patent
Watanabe

(10) Patent No.: US 8,548,004 B2
(45) Date of Patent: Oct. 1, 2013

(54) PACKET COMMUNICATION APPARATUS AND METHOD FOR PACKET COMMUNICATION

(75) Inventor: Naotoshi Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 367 days.

(21) Appl. No.: 12/785,908

(22) Filed: May 24, 2010

(65) Prior Publication Data
US 2010/0232455 A1 Sep. 16, 2010

Related U.S. Application Data

(63) Continuation of application No. PCT/JP2007/073327, filed on Dec. 3, 2007.

(51) Int. Cl.
*H04J 3/18* (2006.01)

(52) U.S. Cl.
USPC .......................................................... 370/477

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| | | | | |
|---|---|---|---|---|
| 7,828,092 B2 * | 11/2010 | Vogel et al. | ................. | 180/19.3 |
| 8,014,287 B2 * | 9/2011 | Matsushita et al. | ............ | 370/235 |
| 8,051,931 B2 * | 11/2011 | Vogel et al. | ................... | 180/19.3 |
| 2002/0031149 A1 | 3/2002 | Hata et al. | | |
| 2002/0057716 A1 | 5/2002 | Svanbro et al. | | |
| 2002/0059464 A1 | 5/2002 | Hata et al. | | |
| 2003/0007512 A1 | 1/2003 | Tourunen et al. | | |
| 2004/0136380 A1 * | 7/2004 | Ido et al. | .................. | 370/395.52 |
| 2004/0181741 A1 | 9/2004 | Hata et al. | | |
| 2005/0090273 A1 * | 4/2005 | Jin et al. | ........................ | 455/502 |

(Continued)

FOREIGN PATENT DOCUMENTS

| | | |
|---|---|---|
| JP | 2002-094554 | 3/2002 |
| JP | 2002-135362 | 5/2002 |

(Continued)

OTHER PUBLICATIONS

3GPP TS 36.300 V8.1.0 (Jun. 2007); "Evolved Universal Terrestrial Radio Access (E-UTRA) and Evolved Universal Terrestrial Radio Access Network (E-UTRAN)"; Overall description; Stage 2;(Release 8); Sec. 4.3.1, Ch6 Figure 6-1, Ch6 Figure 6-2, Sec. 6.3.1; Dated Jun. 2007.

(Continued)

*Primary Examiner* — Jung-Jen Liu
(74) *Attorney, Agent, or Firm* — Myers Wolin, LLC

(57) ABSTRACT

A packet communication apparatus that carries out packet communication with a second packet communication apparatus via a logical connection through header processing of compressing or decompressing a packet header, the apparatus managing a first state machine of a first header processing state concerning a first packet flow of the connection and a second state machine of a second header processing state concerning a second packet flow of the connection; and controlling a state transition of a third state machine that is one of the first state machine and the second state machine on the basis of a state transition of a fourth state machine that is the other of the first state machine and the second state machine.

11 Claims, 17 Drawing Sheets

(56) References Cited

U.S. PATENT DOCUMENTS

| | | |
|---|---|---|
| 2005/0094647 A1 | 5/2005 | Hata et al. |
| 2006/0104266 A1* | 5/2006 | Pelletier et al. ............... 370/389 |
| 2006/0187846 A1* | 8/2006 | Pelletier et al. ............... 370/252 |
| 2007/0165635 A1 | 7/2007 | Zhang et al. |
| 2007/0195764 A1* | 8/2007 | Liu et al. ....................... 370/389 |
| 2008/0261583 A1* | 10/2008 | Yi et al. ....................... 455/422.1 |
| 2010/0034088 A1* | 2/2010 | Sakata et al. .................. 370/235 |
| 2010/0195569 A1* | 8/2010 | Matsushita et al. ........... 370/328 |
| 2010/0195656 A1* | 8/2010 | Matsushita et al. ........... 370/392 |
| 2010/0220593 A1* | 9/2010 | Fujiwara et al. ............... 370/235 |
| 2010/0232427 A1* | 9/2010 | Matsushita et al. ........... 370/389 |
| 2010/0283586 A1* | 11/2010 | Ikeda et al. ................. 340/10.42 |
| 2010/0290393 A1* | 11/2010 | Matsushita et al. ........... 370/328 |
| 2011/0007901 A1* | 1/2011 | Ikeda et al. .................... 380/270 |
| 2011/0110235 A1* | 5/2011 | Ukita et al. .................... 370/235 |
| 2011/0156879 A1* | 6/2011 | Matsushita et al. ........... 340/10.1 |
| 2011/0261706 A1* | 10/2011 | Fujiwara et al. ............... 370/252 |
| 2011/0312278 A1* | 12/2011 | Matsushita et al. ........... 455/66.1 |
| 2012/0019674 A1* | 1/2012 | Ohnishi et al. ............. 348/207.1 |
| 2012/0034507 A1* | 2/2012 | Harada et al. .................. 429/120 |
| 2012/0087255 A1* | 4/2012 | Ukita et al. .................... 370/252 |

FOREIGN PATENT DOCUMENTS

| | | |
|---|---|---|
| JP | 2004-514341 | 5/2004 |
| JP | 2004-215307 | 7/2004 |
| JP | 2004-229318 | 8/2004 |
| JP | 2004-533792 | 11/2004 |
| JP | 2006-287284 | 10/2006 |
| JP | 2007-502073 | 2/2007 |
| JP | 2007-189697 | 7/2007 |
| JP | 2007-194693 | 8/2007 |

OTHER PUBLICATIONS

International Search Report for corresponding International Patent Application No. PCT/JP2007/073327, mailed Jan. 8, 2008.

Notification of Reason(s) for Refusal issued for corresponding Japanese Patent Application No. 2009-544510 drafted May 28, 2012 with English translation.

* cited by examiner

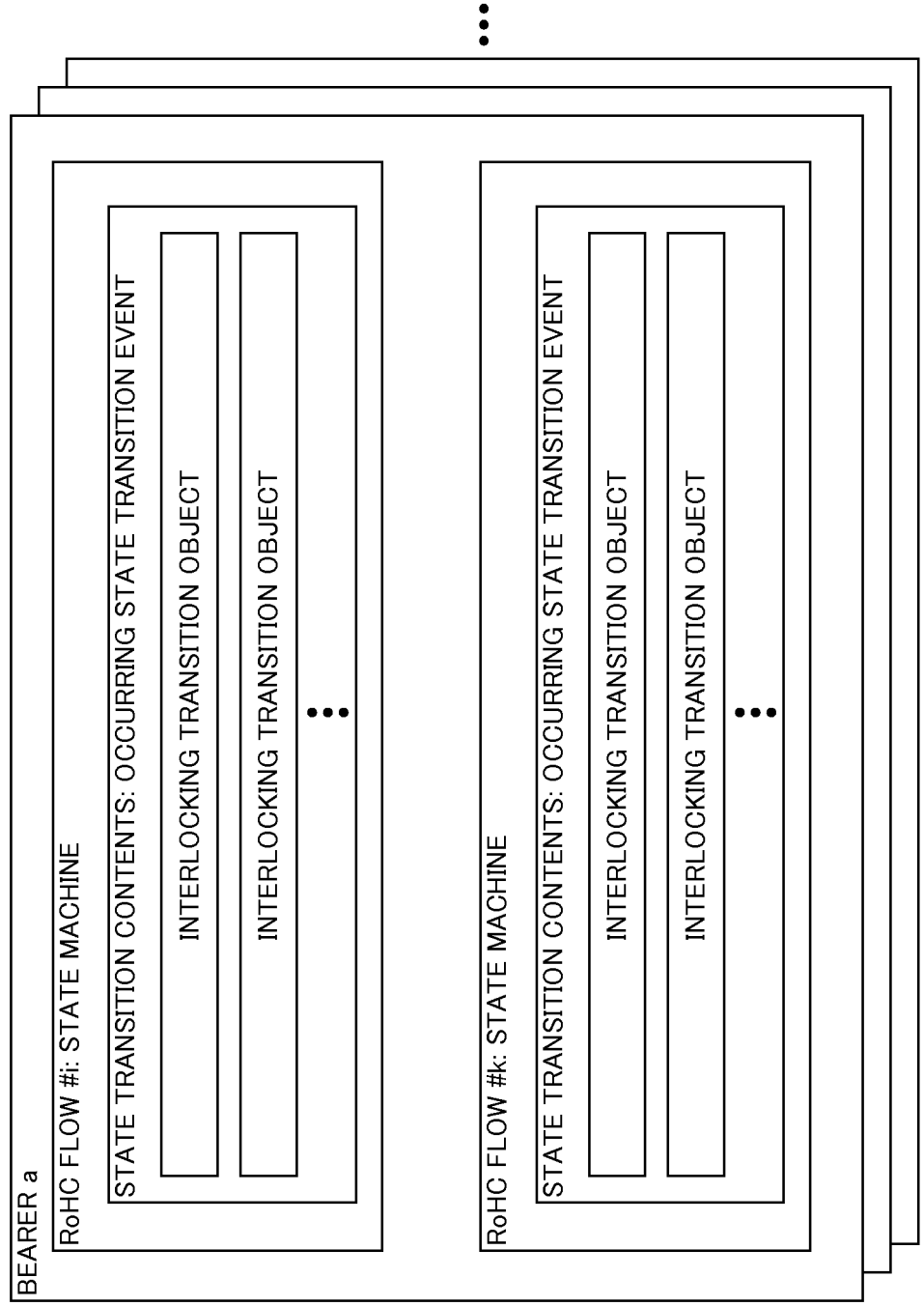

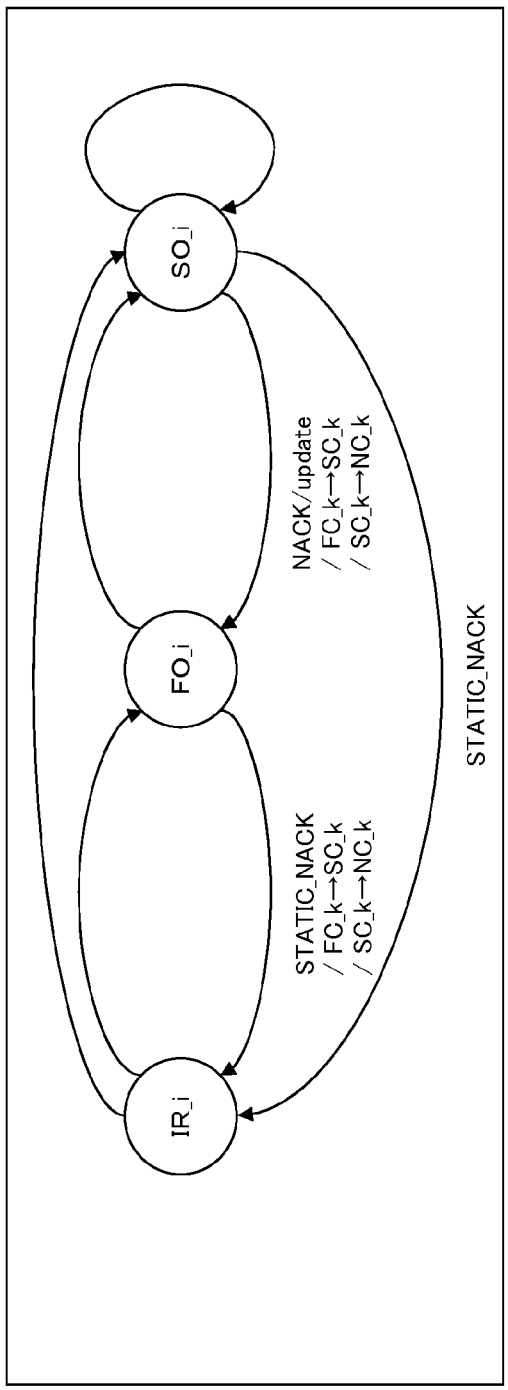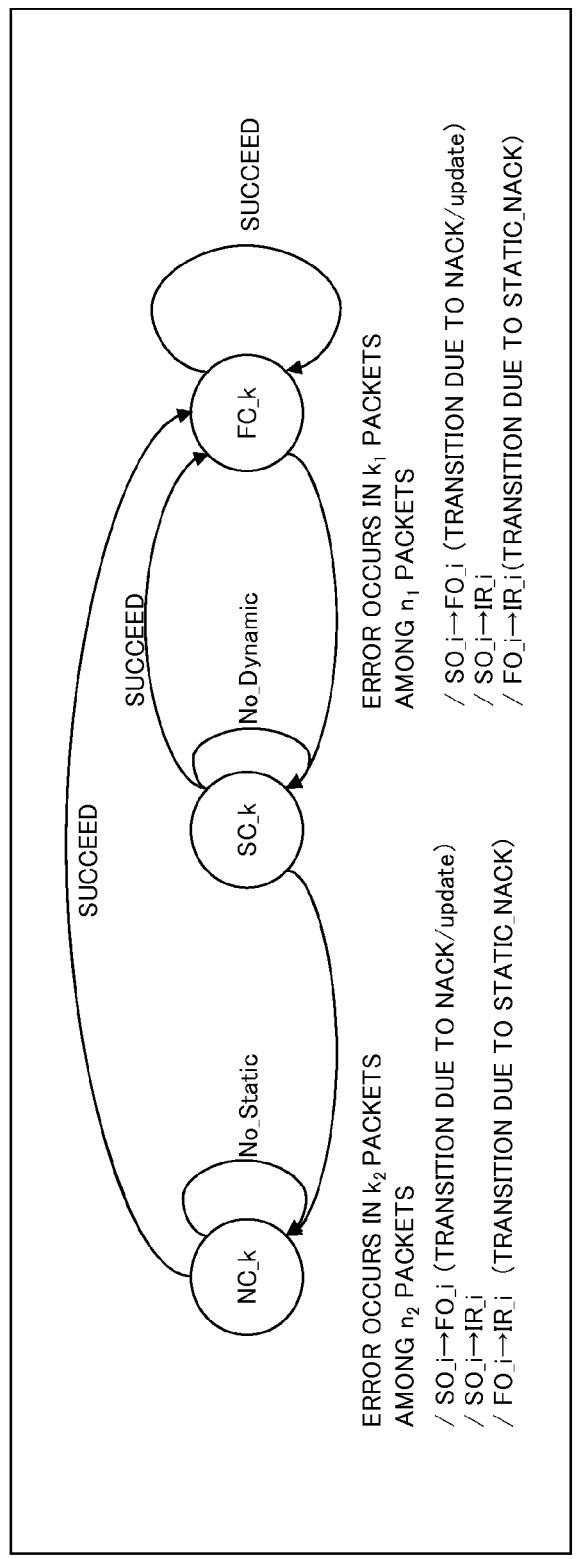
FIG. 5A
FIG. 5B

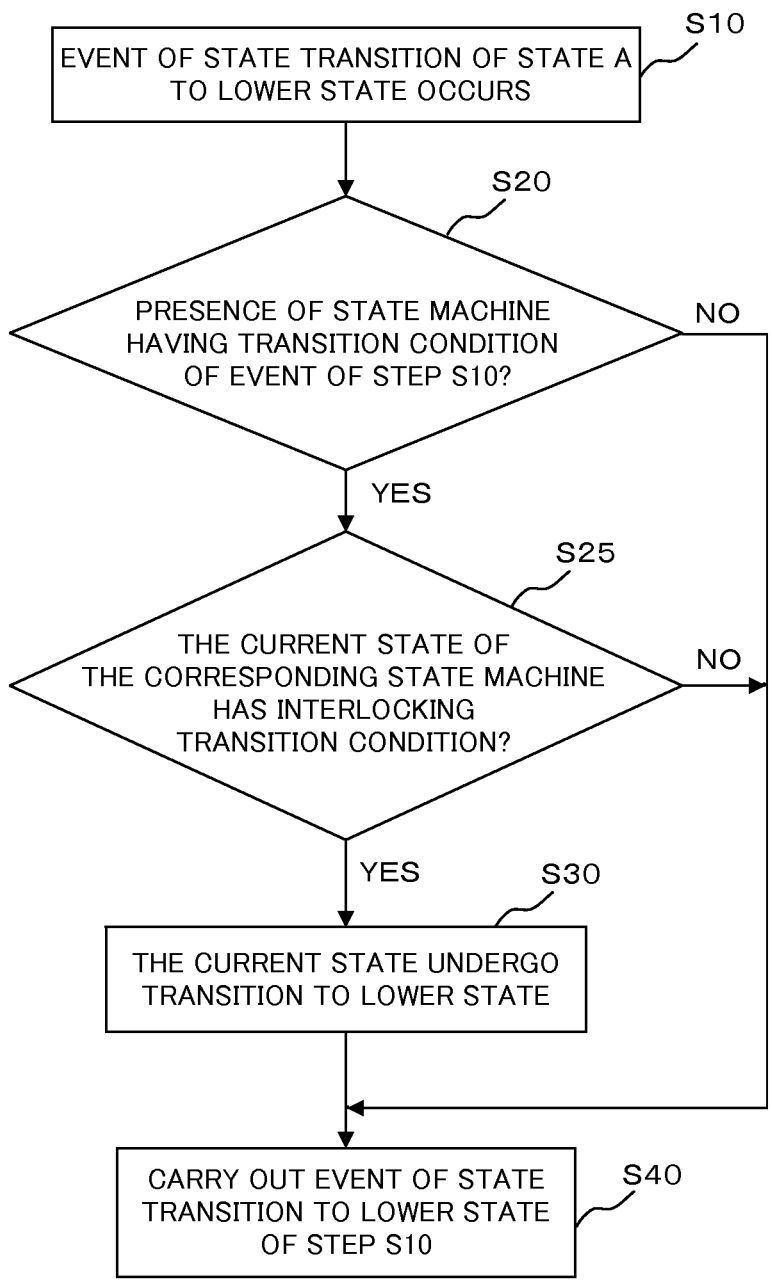

PACKET COMMUNICATION APPARATUS AND METHOD FOR PACKET COMMUNICATION

CROSS-REFERENCE TO RELATED APPLICATION

This application is a continuation application of a PCT international application No. PCT/JP2007/073327 filed on Dec. 3, 2007 in Japan, the entire contents of which are incorporated by reference.

FIELD

The embodiments discussed herein are related to a packet communication apparatus and a method for packet communication.

BACKGROUND ART

One of the techniques that can be applied to packet communication in a 3GPP mobile communication system is the Robust Header Compression (RoHC) technique (see Non-Patent Literature 1). In the scheme of RoHC, the header compression efficiency at the packet transmitting end is adaptively varied (controlled) with the result of header decompression (restoring) at the packet receiving end.

A technique of RoHC is disclosed in Patent Literature 1 in which, upon detection of an error in the header of a received packet, the packet receiving end transmits request for updating context information to a packet transmitting end and when a number of requests for updating are received by the packet transmitting end in a predetermined period, the packet transmitting end transmits a packet having a header to be used for updating the context information to the packet receiving end after the packet receiving end restores the packet without referring to context information.

For example, the Patent Literatures 2 and 3 disclose methods in which: for example, an error in a packet having a restored header is detected and requirement of updating for stored context information is judged on the basis of the relationship between the number of packets having errors and the number of packets free from error; and a request for updating information is requested in order to update the context information.

Furthermore, the Patent Literature 4 discloses a method in which the number of ACK or NACK packets received in a unit time X is counted; when the operation mode of packet header compression is in the compression efficiency preference mode and the number of NACK packets exceeds the predetermined value Y, the operation mode is switched to the reliability preference mode; and when the operation mode is in the reliability preference mode and when the number of ACK packets received in the unit time X exceeds the predetermined value Z, the operation mode is switched to the compression efficiency preference mode.

In the Patent Literature 5 discloses, for example, a method of varying the operation of a compressor at periodic intervals, and varying the operation of the compressor in accordance with a feedback from a decompressor.

Non Patent Literature 1: 3GPP TS36.300 V8.1.0 (2007-06), 4.3.1, FIGS. 6-1, 6-2, 6.3.1, 3rd Generation Partnership Project, [retrieved on Dec. 3, 2007]
Patent Literature 1: Japanese Laid-Open Patent Publication No. 2002-94554
Patent Literature 2: Japanese Laid-Open Patent Publication No. 2004-229318
Patent Literature 3: Japanese Laid-Open Patent Publication No. 2004-215307
Patent Literature 4: Japanese Laid-Open Patent Publication No. 2002-135362
Patent Literature 5: Japanese National Publication of International Patent Application No. 2007-502073

However, the above conventional technique merely controls the RoHC state transition of each individual packet flows belonging to the same bearer (i.e., a logical connection) independently from one another.

SUMMARY (1) According to an aspect of the embodiments, an apparatus includes a packet communication apparatus that carries out packet communication with a second packet communication apparatus via a logical connection through header processing of compressing or decompressing a packet header, the apparatus including: state machine managing unit that manages a first state machine of a first header processing state concerning a first packet flow of the connection and a second state machine of a second header processing state concerning a second packet flow of the connection; and controlling unit that controls a state transition of a third state machine that is one of the first state machine and the second state machine on the basis of a state transition of a fourth state machine that is the other of the first state machine and the second state machine.

(2) According to an aspect of the embodiments, a method includes a method for packet communication between packet communication apparatuses coupled via a logical connection through header processing of compressing or decompressing a packet header, the method including: managing a first state machine of a first header processing state concerning a first packet flow of the connection and a second state machine of a second header processing state concerning a second packet flow of the connection; and controlling a state transition of a third state machine that is one of the first state machine and the second state machine on the basis of a state transition of a fourth state machine that is the other of the first state machine and the second state machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating an example of state machine association data/interlocking transition condition data;

FIG. 5A is a diagram illustrating a state machine of a compressor of the first embodiment;

FIG. 5B is a diagram illustrating a state machine of a decompressor of the first embodiment;

FIG. 8 is a flow diagram illustrating an example of operation of the communication system of the first modification;

DESCRIPTION OF EMBODIMENTS

Hereinafter, embodiments will be described with reference to the drawings. Note that the embodiments are not limited to the embodiments to be described below, but may be modified in various ways without departing from spirits and scope of the embodiments, as a matter of course.

(1) Example of System to be Applied

An embodiment to be detailed below is assumed to be a mobile communication system confirming to 3GPP (3rd Generation Partnership Project) as one of the examples of a communication system.

Figure 13:
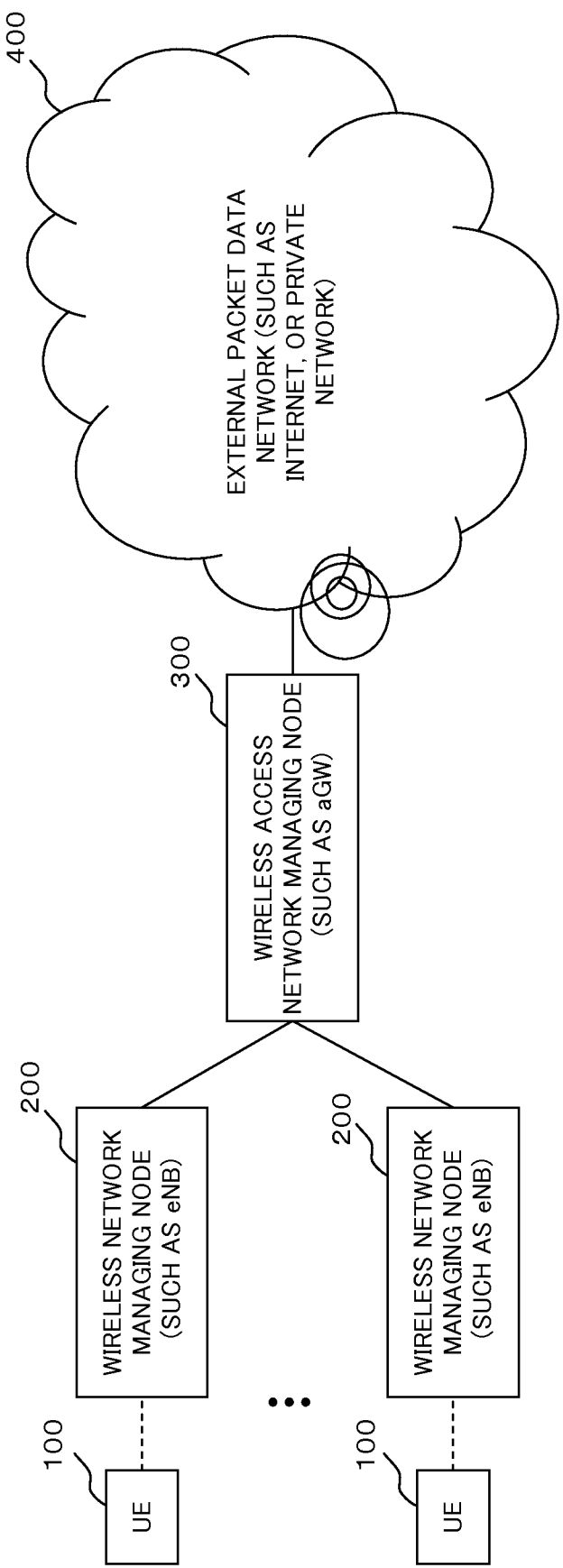
FIG. 13 is a block diagram illustrating an example of the configuration of the 3GPP mobile communication system.

FIG. 13 illustrates an example of configuration of a 3GPP mobile communication system.

In FIG. 13, each User Equipment (UE) 100 has a function of wireless communication with a wireless network managing node (evolved Node-B to be abbreviated to eNB) 200, and communicates with another UE 100 and an external packet network (e.g., Internet or a private network) 400 through the eNB 200.

Each eNB 200 has functions of a wireless station (for example, Node-B) and a Radio Network Controller (RNC) of a previous generation to the Long Term Evolution/System Architecture Evolution (LTE/SAE).

A wireless access network managing node (for example E-UTRAN Access Gateway to be abbreviated to aGW) 300 manages a number of eNBs 200, and transmits and receives messages between a UE 100 and an external packet network 400.

In relation to a packet header used for packet communication in the above system, the overhead of the packet is large as compared to the packet data thereof particularly in forwarding voice data. For this reason, packet communication performed simply by attaching an unprocessed header to the packet data may be a cause of inefficiency. The quality of communication through a wireless segment more deteriorates than that of communication through a wired segment. In addition, wireless communication has limited communication resources such as bandwidth, and therefore requires improvement in communication efficiency.

For the above, packet communication between an eNB 200 and a UE 100 sometimes undergoes header compression (RoHC: Robust Header Compression) (see, Non-Patent Literature 1, for example).

According to Non-Patent Literature 1, the RoHC header compression state at a compressor in the packet transmitting end has three states of: Initialization and Refresh (IR) state in which the entire header information not being compressed is transmitted; First Order (FO) state in which only moiety (e.g., sequence number) that dynamically varies in the header information is transmitted; and Second Order (SO) state in which the moiety that dynamically varies in the header information is encoded and the minimum filed is transmitted. Furthermore, RoHC defines three forwarding modes of Unidirectional (U) mode, Optimistic (O) mode, and Reliable (R) mode, which are interchangeable during communication.

On the contrast, the RoHC header decompression state at a decompressor in the opposing packet receiving end also has three states of No Context (NC) state in which there is no header information for decoding; Static Context (SC) state in which there is static header information (e.g., address and/or port number) (that is, in which dynamic field reception and updating are required); and Full Context (FC) state in which differential information of the header value that dynamically varies can be decoded (that is, in which field information can be concurrently decoded).

In the RoHC scheme, the header compression state of the compressor of the packet transmitting end in O or R mode is controlled in accordance with feedback information from the opposing station (i.e., the receiving end), and the header decompression state of the receiver of the packet receiving end is controlled in accordance with the result (result of error checking) of header decompression of the packet data from the opposing station (transmitting end) (see Patent Literatures 1-5, for example).

Figure 14:
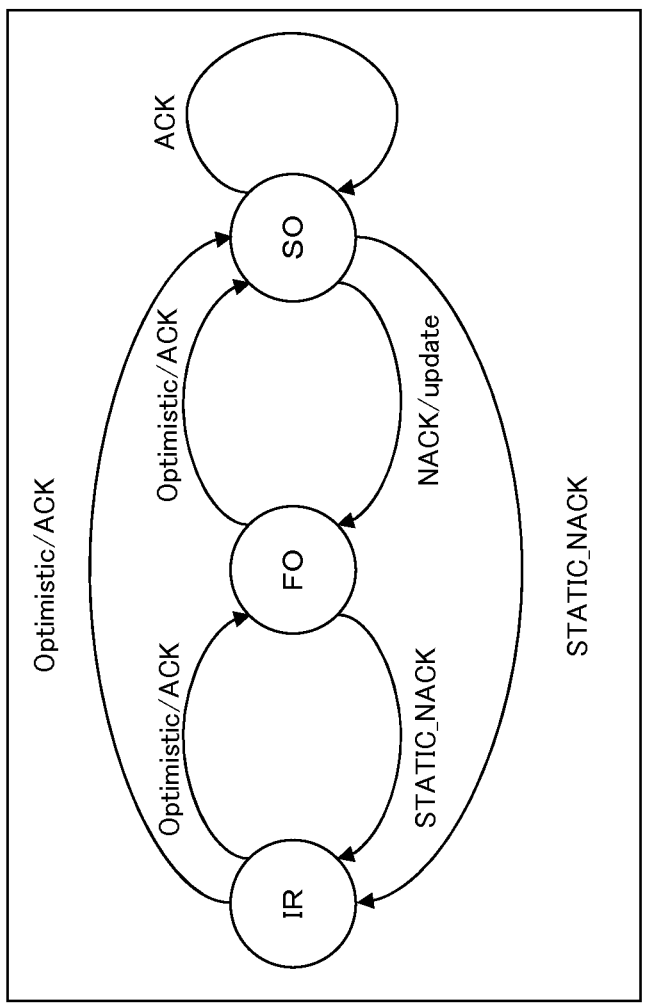
FIG. 14 is a diagram illustrating a state transition of the compressor in ROHC O-mode.
Figure 15:
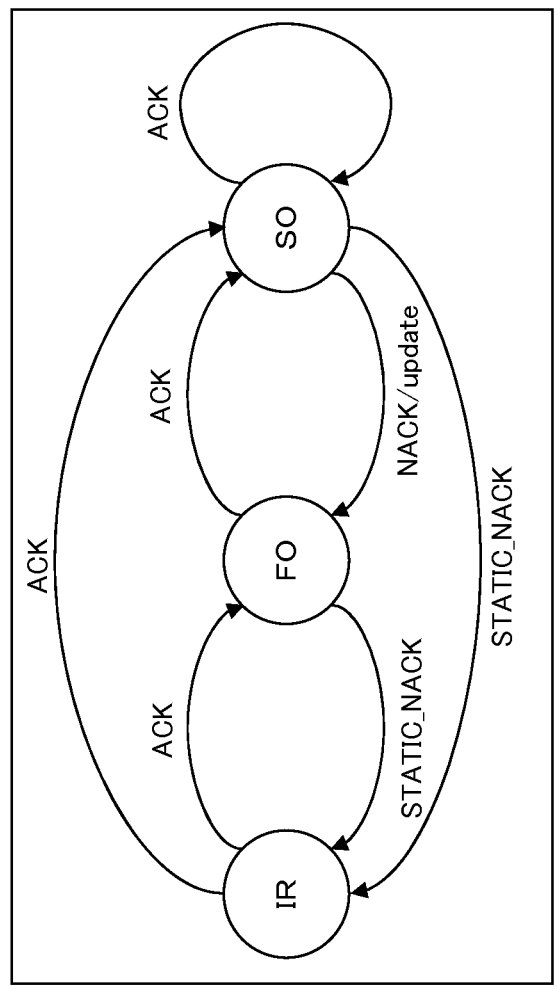
FIG. 15 is a diagram illustrating a state transition of the compressor in ROHC R-mode.
Figure 16:
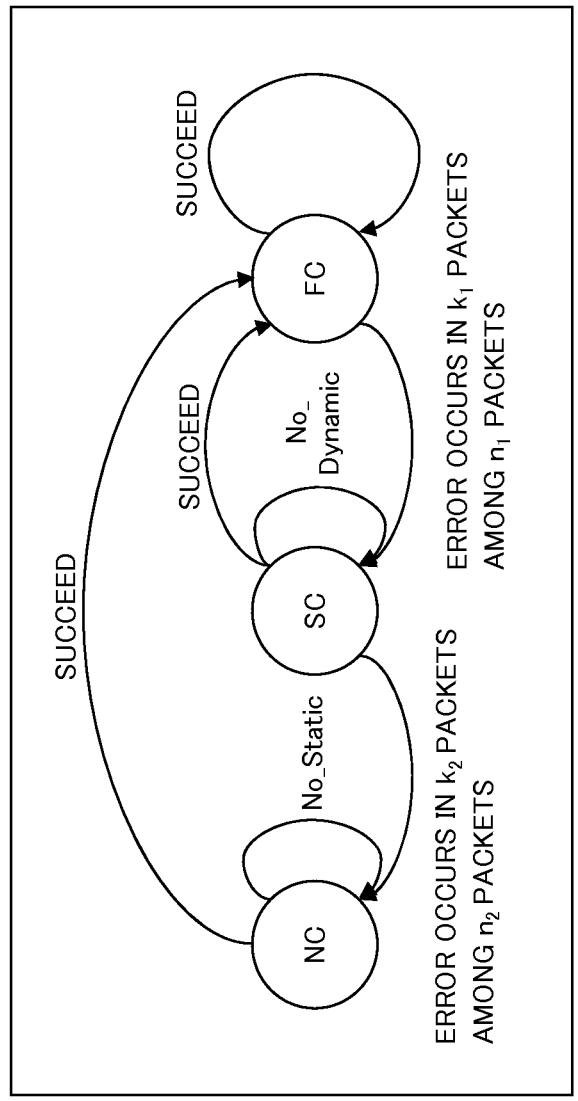
FIG. 16 is a diagram illustrating a state transition of the decompressor.

FIGS. 14 through 16 illustrate state machines (state transition diagrams) of the above header compression state and header decompression state. FIG. 14 illustrates a state machine of a compressor in O mode; FIG. 15 illustrates a state machine of a compressor in R mode; and FIG. 16 illustrates a state machine of a decompressor.

As illustrated in FIG. 14, in O mode, the compressor starts the operation from IR state and therefore transmits a packet header containing complete context information (reference information) for packet header decompression to the opposing station.

When the compressor estimates that the decompressor of the opposing station is capable of normally decompressing (restoring) packet data in accordance with a higher header compressing state (FO state or SO state) (Optimistic) or when the compressor receives an acknowledgment (ACK) as feedback information from the decompressor of the opposing station, the header compression state undergoes a transition to the higher state of FO state or SO state.

After the transition in the header compression state to FO state, when the compressor estimates that the decompressor of the opposing station is capable of normally decompress packet data in accordance with a higher header compression state (i.e., SO state) (Optimistic) or when the compressor receives an acknowledgment (ACK) as feedback information from the decompressor of the opposing station, the header compression state undergoes a transition to the higher state of SO state.

Conversely, when the compressor in SO state receives a static negative acknowledgement (STATIC_NACK) as the feedback information from the decompressor of the opposing station, the header compression state undergoes a transition to the lower state of IR state.

After the transition in the header compression state to SO state, when the compressor receives an acknowledgment (ACK) as feedback information from the decompressor of the opposing station, the header compression state remains in the current SO state.

In the meantime, when the compressor receives a negative acknowledgment as feedback information from the decompressor of the opposing station or when the compressor receives a request for updating the context information from the decompressor, the header compression undergoes a transition shifts to the lower state of FO state. In addition, when the compressor receives a static negative acknowledgement (STATIC_NACK) as the feedback information from the decompressor of the opposing station, the header compression state undergoes a transition to the lower state of IR state.

As illustrated in FIG. 15, differently from O mode, R mode does not make state transition (control) on the basis of estimation. For example, when the compressor receives an acknowledgement from the decompressor of the opposing station, the header compression state undergoes a transition to a higher state (i.e., from IR state to FO or SO state, or from FO state to SO state).

On the other hand, as illustrated in FIG. 16, the decompressor of the opposing station starts the operation from NC state and therefore carries out header decompression on packet (IR packet) data received from the compressor of the opposing station on the basis of the complete context data. If the header decompression succeeds, the header decompression state of the decompressor undergoes a transition to FC state.

When the decompressor in FC state succeeds in the header decompression on packet data received from the compressor on the opposing station, the header decompression state remains in the current state of FC state. However, when the header decompression fails, the header decompression state undergoes a transition to a lower state of SC state. In the example of FIG. 16, when the error rate in FC state exceeds the predetermined error rate, for example, when $k_1$ packet data in $n_1$ packet data received from the opposing station results in failure in the header decompression, the header decompression state undergoes a transition to the lower state of SC state.

When the decompressor in SC state succeeds in header decompression on the packet data received from the compressor of the opposing station, the header decompression state undergoes a transition to FC state. Conversely, the decompressor fails in the header decompression, the header decompression state shifts to the lower state of NC state.

In the example of FIG. 16, when the error rate exceeds the predetermined error rate, for example, when $k_2$ packet data in $n_2$ packet data received from the opposing station fails in the header decompression, the header decompression state undergoes a transition to the lower state of NC state. Furthermore, when dynamic context information is required (No Dynamic) in SC state, the header decompression state remains in SC state.

When the decompressor in NC state succeeds in header decompression on packet data received from the compressor of the opposing station, the header decompression state undergoes a transition to FC state. Meanwhile, when the static context information is required (No_Static) in NC state, the header decompression state remains in NC state.

Figure 17:
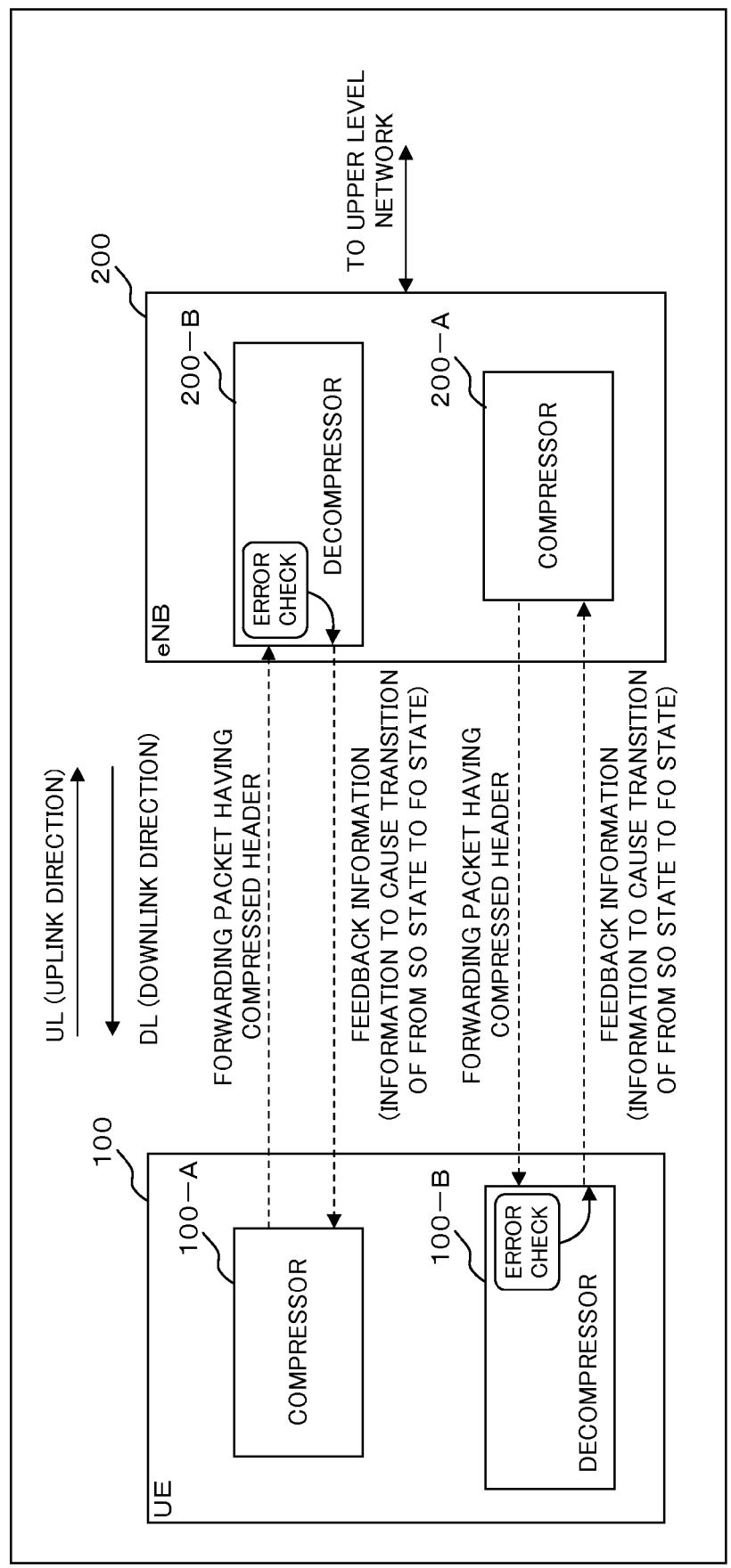
FIG. 17 is a diagram illustrating an example of operation of a conventional communication system.

Description will now be made in relation to operation of the system that carries out the above state transition (control) with reference to FIG. 17.

For example, in packet communication confirming to RoHC between a UE 100 including a compressor 100-A and a decompressor 100-B and an eNB 200 including a decompressor 200-B and a compressor 200-A, communication in uplink direction (hereinafter called UL) of from the UE 100 to the eNB 200 transmits, to the decompressor 200-B, packet data subjected to header compression in accordance with the current header compression state in the compressor 100-A.

After receiving the packet data having a compressed header from the compressor 100-A, the decompressor 200-B decompresses (decodes) the received packet data through the use of header information (context information) received previously. Concurrently, the decompressor carries out error check on the packet data and returns the result of the error check, as the feedback information, to the compressor 100-A.

Specifically, if the decoding succeeds, ACK is returned as the feedback information to the compressor 100-A. However, if the decoding fails, information about packet data which is not decompressed due to, for example, missing of context information is sent to the compressor 100-A to be the feedback information (e.g., NACK as information to cause state transition of from SO state to FO state).

As described above, the compressor 200-B makes state transition in the header decompression state to NC, SC, or FC state in accordance with the result of error check, and the compressor 100-A causes state transition in the header compression state to IR, FO, or SO state in accordance with feedback information.

Also in communication in downlink direction (hereinafter called DL) of from the eNB 200 to the UE 100, control of a state transition is carried out in the same manner as UL.

When the context data for decoding becomes out of date or when the context data cannot be appropriately updated, the decompressor 200-B (100-B) notifies the compressor 100-A (200-A) of feedback information to make a transition in the header compression state to a lower state of the current state (i.e. IR state or FO state), so that the context information is updated.

(2) Overview

Referring to example of FIG. 1, the overview of this example will now be described.

Figure 1:
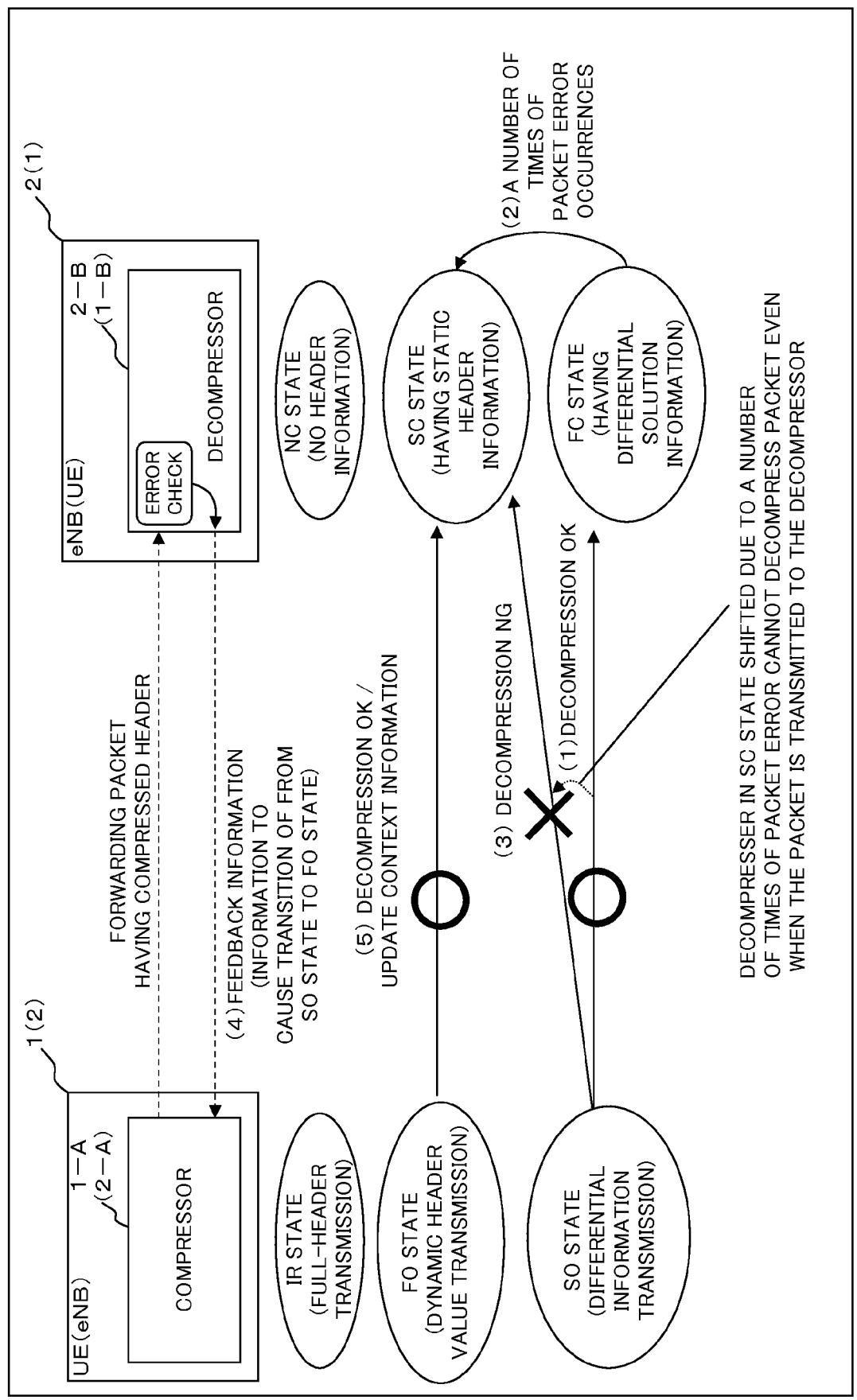
FIG. 1 is a diagram illustrating the overview of the embodiments.

For example, as illustrated in FIG. 1, in transmitting packet data having a compressed header from the compressor of the UE 1 (eNB 2) to the decompressor of the opposing station (eNB 2 (UE 1)), the packet data is normally decoded when the header compression state is SO state and the header decompression state is FC state ((1) decompression OK).

However, due to a change in communication environment between the UE 1 and the eNB 2 or for another reason, when the decompressor 2-B (1-B) at the opposing station detects a number of times of packet error occurrences ((2) a number of times of packet error occurrences), the header decompression state undergoes a transition of from FC state to a lower state of SC state as described above. The state transition already put into practice described above is sometimes called "normal transition" in order to differentiate from the state transition of this example.

Until the receipt of feedback information, the compressor 1-A (2-A) does not grasp that the header decompression state of the decompressor 2-B (1-B) at the opposing station underwent a transition. Consequently, the compressor continues to send packet data (including encoded dynamic header information) subjected to the header compression in SO state to the decompressor at the opposing station.

However, the decompressor 2-B (1-B) at the opposing station is in SC state and therefore has only static header information, so that the decompressor cannot normally decode the received packet data, which will be consequently discarded ((3) decompression NG).

The decompressor 2-B (1-B) at the opposing station transmits feedback information to make a transition of from SO state to FO state to the compressor 1-A (2-A) in accordance with the header decompression state of the decompressor itself ((4) feedback information).

As a result, the header compression state of the compressor 1-A (2-A) undergoes a normal transition of from SO state to FO state, and thereby the context data is updated, so that the decompressor 2-B (1-B) at the opposing station can carry out normal decoding ((5) decompression OK/updating of context information.

Voice over IP (VoIP) communication is sometimes conducted between the UE 1 and the eNB 2. Since VoIP communication uses packet having large overhead, that is, the header being larger relatively to the payload data (packet data), it is preferable to adopt RoHC scheme. In addition, since VoIP communication is sensitive to communication delay, it is preferable to treat the VoIP communication through the communication path service (i.e., bearer) having a high preference (i.e., a high QoS).

Even when service by a high-preference bearer is provided for communication between the UE 1 and the eNB 2, A transition in the header decompression state (for example, from FC state to SC state) sometimes occurs due to a number of times of packet error occurrences. This is caused when the UE 1 is positioned at bad radio condition point (e.g., in a tunnel, in a building, behind a building).

In this case, even when the header decompression state of the decompressor 2-B (1-B) at the opposing station undergoes a transition due to a number of times of packet error occurrences, the feedback information notifying the transition does not sometimes reach the compressor 1-A (2-A).

As a consequence, even when the header decompression state of the decompressor 2-B (1-B) at the opposing station undergoes a transition, the header compression state of the compressor does not undergo a transition. The decompressor 2-B (1-B) at the opposing station after the transition receives packet data having a header compressed in a manner that the decompressor cannot normally decode. Such packet data is discarded at the decompressor 2-B (1-B) at the opposing station.

A change in communication environment between the UE 1 and eNB 2 sometimes delays arrival of feedback information. In this case, the decompressor 2-B (1-B) at the opposing station receives packet data having a header compressed in a manner that the decompressor cannot normally decode for a time period in proportional to the length of the delay of the feedback information, which leads to discarding a large amount of packet data.

As one of the solution, in an non-limited example to be detailed below, a packet communication apparatus including a compressor 1-A (2-A) and a decompressor 2-B (1-B) controls state transition of the state machine of a first header processing state or a second header processing state in accordance with a state transition of the state machine of the other header processing state (hereinafter, the state transition is sometimes referred to as "interlocking transition" to differentiate from the above normal transition).

For example, in the event of detection of a normal transition in the header decompression state of the decompressor 1-B (2-B) to a lower state (e.g. from FC state to SC state), interlocking transition of from the current state to a lower state (e.g., from SO state to FO state) is carried out on the header compression state of the compressor 1-A (2-A) of the same station.

That makes transition of the header compression state of the compressor 1-A (2-A) of the same station possible regardless of feedback information from the decompressor 2-B (1-B) at the opposing station. Namely, even when the feedback information does not arrive or does delay, interlocking transition of the header compression state of the compressor 1-A (2-A) can be made in accordance with the transition in the header decompression state of the decompressor 1-B (2-B) in the same station. Consequently, it is possible to rapidly and surely cause the header compression state of the compressor 1-A (2-A) of the same station to undergo a transition to one which has a high possibility of succeeding in decoding at the opposing station.

In other words, the header compression state of the compressor 1-A (2-A) of the same station can made to be compatible (to conform) with the header decompression state of the decompressor 2-B (1-B) at the opposing station, so that the resultant shortening the time period of losing packet data can improve the throughput of the communication system.

(3) First Embodiment (3.1) Configuration of the System

Figure 2:
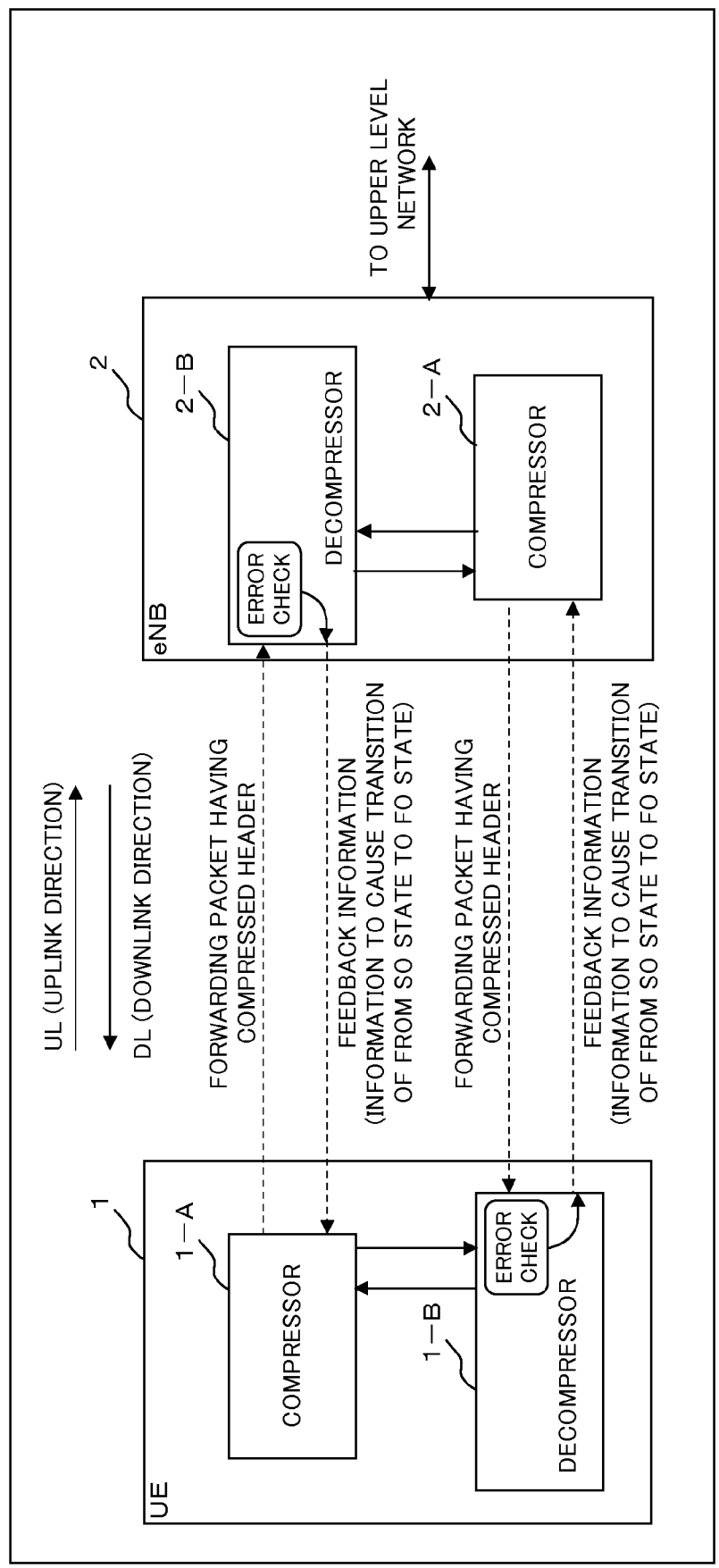
FIG. 2 is a block diagram illustrating the configuration of a communication system according to a first embodiment.

FIG. 2 is a block diagram illustrating the configuration of the communication system according to a first embodiment. The system of FIG. 2 includes an upper network (not illustrated), such as an aGW or an external packet network, a UE 1, and an eNB 2.

Specifically, the communication system of FIG. 2 includes the UE 1 (or the eNB 2), serving as a packet transmitting unit which carries out header processing to compress or decompress a packet header and which carries out packet communication with the eNB 2 (or the UE 1) through a logical connection (e.g., a bearer), and the eNB 2 (or the UE 1), serving as a packet receiving unit which decompresses (restores) packet data having a compressed header from the packet transmitting unit on the basis of context information previously received.

Focusing on the main parts of the UE 1 and the eNB 2, the UE 1 includes a compressor 1-A and a decompressor 1-B; and the eNB 2 includes a decompressor 2-B and a compressor 2-A.

Here, the compressor 1-A (2-A) has a function of performing RoHC processing (compression) on (the packet header of) packet data to be transmitted to the opposing station in accordance with the current header compression state (i.e., one of IR, FO, and SO states) and transmitting the packet data having a compressed header.

The decompressor 2-B (1-B) at the opposing station extracts header information (context information) of packet data from the compressor 1-A (2-A) in accordance with the current header decompression state (one of NC, SC, or FC state), and decompresses (restores) the packet data having a compressed header through the use of the context data. In addition, the decompressor 2-B (1-B) has a function of carrying out error check during the decompression and returning the result of the error check, as the feedback information (e.g., information to cause transition of from SO state to FO state) to the compressor 1-A (2-A).

Packet data that cannot be decompressed because of loss of context information or other reason is discarded by the decompressor 2-B (1-B), while the packet data normally decompressed is transmitted to the aGW (not illustrated) of the upper network.

Besides the above function, the decompressor 1-B (2-B) of the first embodiment has a function of notifying information about transition in the header decompression state of the decompressor itself to the compressor 1-A (2-A) in the same station. Upon receipt of the information about the transition in the header decompression state from the decompressor 1-B (2-B), the compressor 1-A (2-A) makes an interlocking transition in the header compression state in accordance with the received information.

In the meanwhile, the compressor 1-A (2-A) of the first embodiment also has a function of notifying information about transition in the header compression state to the decompressor 1-B (2-B) in the same station. Upon receipt of the information about transition in the header compression state from the compressor 1-A (2-A), the decompressor 1-B (2-B) similarly makes an interlocking transition in the header decompression state in accordance with the received information.

With this notification, even when feedback information from the decompressor 2-B (1-B) at the opposing station does not arrive or does delay due to a change in communication environment between the UE 1 and the eNB 2, it is possible to rapidly cause the header compression state to undergo an interlocking transition to a state suitable for the latest communication environment.

As a consequence, it is possible to shorten the period in which packet data having a compressed header cannot be normally restored, so that the resultant suppression of losing packet data can improve the throughput of the communication system.

The combination of the above method of controlling state transition and the conventional method of controlling state transition can simply double the feedback paths for state transition, which enhances error tolerance.

(3.2) Details of UE1 (eNB2)

Figure 3:
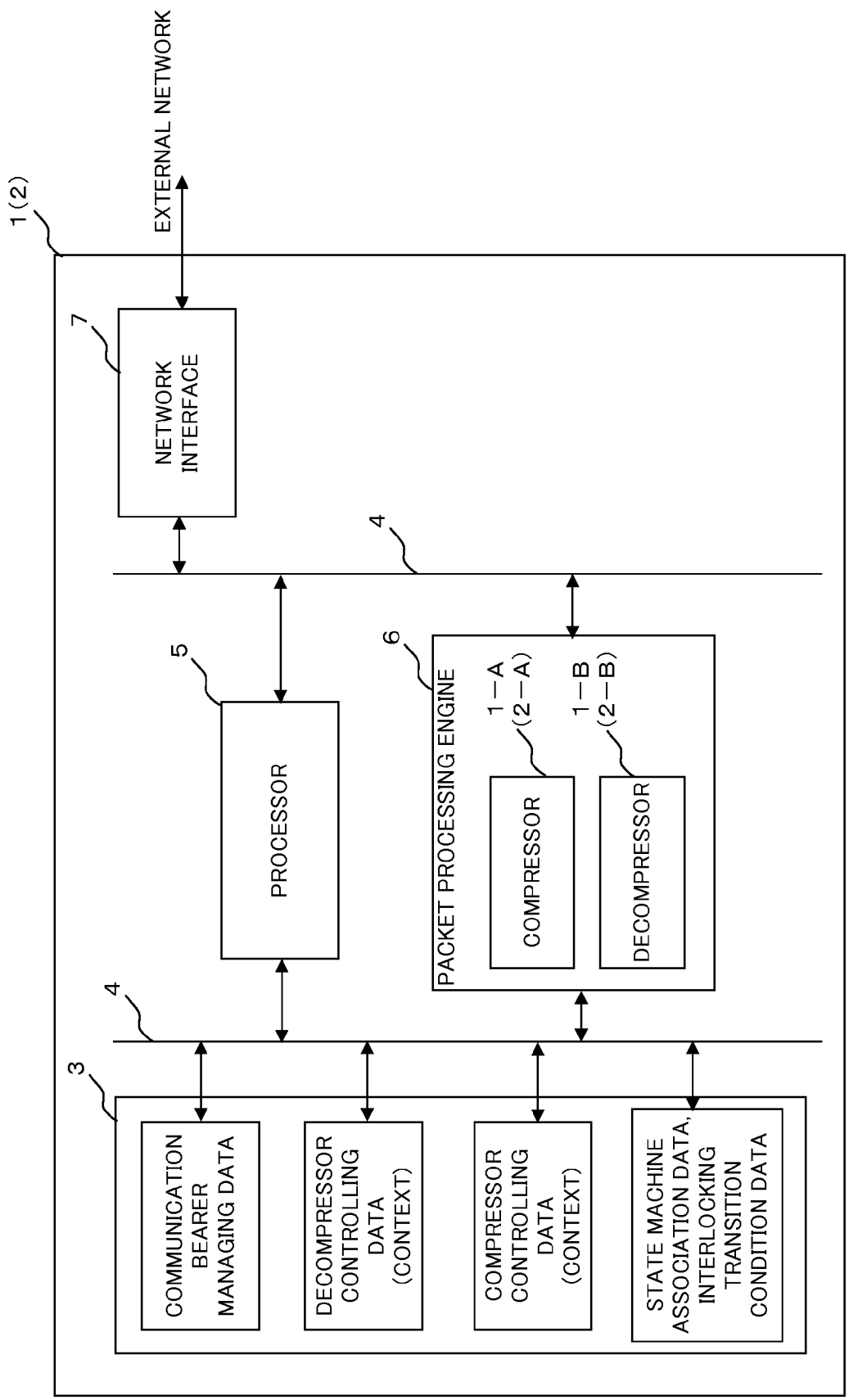
FIG. 3 is a block diagram illustrating the configuration of a UE and an eNB of the first embodiment.

FIG. 3 is a block diagram illustrating the configuration of the UE 1 and the eNB 2 according to the first embodiment.

As illustrated in FIG. 3, the UE 1 (eNB 2) includes, for example, a memory 3, a bus 4, a processor 5, a packet processing engine 6, and a working interface 7. the packet processing engine 6 includes the compressor 1-A (2-A) and the decompressor 1-B (2-B).

The memory 3 has a function of storing data to be used for various controls by the processor 5 and the packet processing engine 6. The memory 3 stores, for example, communication bearer managing data, decompressor controlling data, compressor controlling data, and state machine association data/interlocking transition condition data.

The communication bearer managing data is information to manage the communication path (bearer) between the UE 1 and the eNB 2. The decompressor controlling data is information to manage (control) the header decompression state of the decompressor 1-B (2-B), and includes, for example, information about a state machine, the header decompression state, and transition in the state of the decompressor 1-B (2-B).

The compressor controlling data is information to manage (control) the header compression state of the compressor 1-A (2-A), and includes, for example, information about a state machine, the header compression state, and transition in the state of the compressor 1-A (2-A).

The state machine association data/interlocking transition condition data is information about the association of state machines (e.g., the header compression state and the header decompression state) belonging to the same bearer, and has a data structure illustrated in, for example, FIG. 4 as detailed below. The state machine association data/interlocking transition condition data is created by the processor 5 and packet processing engine 6 through associating the state machines with one another when the processor 5 establishes the bearer, when the packet processing engine 6 starts transmitting and receiving packet flow processed by RoHC scheme, and when the state machines are created in the compressor controlling data and the decompressor controlling data.

The bus 4 is a communication path through which various kinds of data is transmitted and received. The processor 5 variously controls the UE 1 (eNB 2), and has, for example, a function of communication control, such as bearer establishment, through the use of the bearer communication managing data stored in the memory 3.

The packet processing engine 6 variously controls the compressor 1-A (2-A) and the decompressor 1-B (2-B), and has a function, for example, of controlling transition in the header compression state of the compressor 1-A (2-A) and transition in the header decompression state of the decompressor 1-B (2-B) through the use of the compressor controlling data, the decompressor controlling data, and the state machine association data/interlocking transition condition data stored in the memory 3. The compressor 1-A (2-A) and the decompressor 1-B (2-B) have the same functions as those described in the above item (3.1).

Namely, the memory 3 and the packet processing engine 6 function as state machine managing unit that manages a header compression state or a header decompression state (i.e., a state machine of a first header processing) of a transmitting packet flow and a receiving packet flow (first packet flow) of the bearer, and state machine managing unit that manages a header compression state or a header decompression state (i.e., a state machine of a second header processing) of a transmitting packet flow and a receiving packet flow (second packet flow) of the bearer.

The packet processing engine 6 also functions as controlling unit that controls the state transition of one of the above two state machines in accordance with the state transition of the other state machine.

The working interface 7 has a function as an interface between the UE 1 (the eNB 2) and the external network (a wireless network for the eNB 2), and for example, has a functions of performing predetermined transmitting processing on packet data having a compressed header from the compressor 1-A (2-A) and transmitting the packet data to the external network, and of performing predetermined receiving processing on packet data from the external network and transmitting the received packet data to decompressor 1-B (2-B) through the bus 4. The working interface 7 of the UE 1 additionally has a function for transmitting data to and receiving data from an upper protocol layer (application). The working interface 7 of the eNB 2 has a function of transmitting data to and receiving data from the external network in addition to the function of transmitting data to and receiving data from the UE 1.

Here, the state machine association data/interlocking transition condition data will now be detailed with reference to FIG. 4. FIG. 4 illustrates an example of the state machine association data/interlocking transition condition data.

As illustrated in FIG. 4, the state machine association data/interlocking transition condition data is created through associating, for example, state transition content represents an occurring state transition event with interlocking transition object representing a state transition object that is to undergo an interlocking transition in response to the state transition content for each of a number of RoHC flows (flows of transmitting and receiving packets) of a number of bearers set between the UE 1 and the eNB 2.

Specifically, assuming that the state transition contents of a bearer "a" sets a transition of the header decompression state of the receiving packet flow "#k" of from FC state to SC state, and the interlocking transition object associated with the state transition contents is set to be transition of the header compression state of the transmitting packet flow "#i" of from SO state to FO state, upon detection of a transition in the header decompression state of the receiving packet flow "#k" of from FC state to SC state (occurrence of a state transition event), the packet processing engine 6 refers to the state machine association data/interlocking transition condition data.

The state machine association data/interlocking transition condition data sets, as an interlocking transition object, state transition of the header compression state of the transmitting packet flow "#i" from SO state to FO state in association with the transition of the header decompression stat of the receiving packet flow "#k" from FC state to SC state. Consequently, the header compression state of the transmitting packet flow "#i" is controlled to undergo a state transition of from SO state to FO state in response to the occurrence of the state transition event. In the same manner, transition in the header decompression state of the receiving packet flow "#k" can be made in response to the occurrence of a transition event of the header compression state of the transmitting packet flow "#i".

Then, an example of a method of controlling the above state transition will be described with reference to FIGS. 5A and 5B. FIG. 5A is a diagram of a state machine of the compressor 1-A (2-A) and FIG. 5B is a diagram of a state machine of the decompressor 1-B (2-B).

As illustrated in FIG. 5A, the header compression state of the transmitting packet flow "#k" being in SO state (SO_i) is caused to undergo a normal transition upon receiving a negative acknowledgment (NACK) as the feedback information or a request to update the context information from the decompressor 2-B (1-B) at the opposing station. Furthermore, when the header decompression state of the receiving packet flow "#k" undergoes a normal transition of from FC state (FC_k) to SC state (SC_k), or when the header decompression state of the receiving packet flow "#k" undergoes a normal transition of from SC state (SC_k) to NC state (NC_k), the header compression state of the transmitting packet flow "#i" is cause to undergo a interlocking transition to lower state FO state (FO_i).

The header compression state of the transmitting packet flow "#i" being in FO state (FO_i) is caused to undergo a normal transition upon receiving a static negative acknowledgment (STATIC_NACK) as the feedback information from the decompressor 2-B (1-B) at the opposing station. Furthermore, when the header decompression state of the receiving packet flow "#k" made normal transition from FC state (FC_k) to SC state (SC_k), or the header decompression state of the receiving packet flow "#k" undergoes a normal transition of from SC state (SC_k) to NC state (NC_k), the header compression state of the transmitting packet flow "#i" is caused to undergo an interlocking transition to lower state IR state (IR_i).

On the other hand, as illustrated in FIG. 5B, the header decompression state of the receiving packet flow "#k" being in FC state (FC_k) is caused to undergo a normal transition when, for example, $k_1$ packets in the $n_1$ packet received from the opposing station fail in header decompression (exceeding a predetermined error rate). In addition, when the header compression state of the transmitting packet flow "#i" undergoes a normal transition of from SO state (SO_i) to FO state (FO_i), when the header compression state of the transmitting packet flow "#i" undergoes a transition from SO state (SO_i) to IR state (IR_i), or when the header compression state of the transmitting packet flow "#i" undergoes a normal transition from FO state (FO_i) to IR state (IR_i) in response to the feedback information (STATIC_NACK), the header decompression state of the receiving packet flow "#k" is caused to undergo an interlocking transition to the lower state of SC state (SC_k).

Furthermore, the header decompression state of the receiving packet flow "#k" being in SC state (SC_k) undergoes a normal transition when, for example, $k_2$ packets in the $n_2$ packet received from the opposing station fail in header decompression (exceeding a predetermined error rate). In addition, when the header compression state of the transmitting packet flow "#i" undergoes a normal transition of from SO state (SO_i) to FO state (FO_i) in response to feedback information (NACK or update), when the header compression state of the transmitting packet flow "#i" undergoes a transition from SO state (SO_i) to IR state (IR_i), or when the header compression state of the transmitting packet flow "#i" makes a normal transition from FO state (FO_i) to IR state (IR_i) in response to the feedback information (STATIC_NACK), the header decompression state is caused to undergo an interlocking transition to the lower state of SC state (NC_k).

As described above, in the event of state transition of the header compression state (or the header decompression sate) of a station (UE 1 or eNB 2) to a lower state, the header decompression state (or the header compression state) of the same station responsively undergoes an interlocking transition to a lower state in the first embodiment.

The above setting of the state machine association data/interlocking transition condition data is only an example and various modifications can be suggested.

For example, even if the condition for an interlocking transition of a header compression state of from SO state (SO_i) to IR state (IR_i) further includes normal transition of the header decompression state of the receiving packet flow "#k" of from FC state (FC_k) to SC state (SC_k) and normal transition of the header decompression state of the receiving packet flow "#k" from SC state (SC_k) to NC state (NC_k), the first embodiment can be carried out similarly to the above.

(3.3) Operation of the Communication System of the First Embodiment

Next, description will now be made in relation to an example of operation of the communication system of the first embodiment with reference to FIG. 6.

Figure 6:
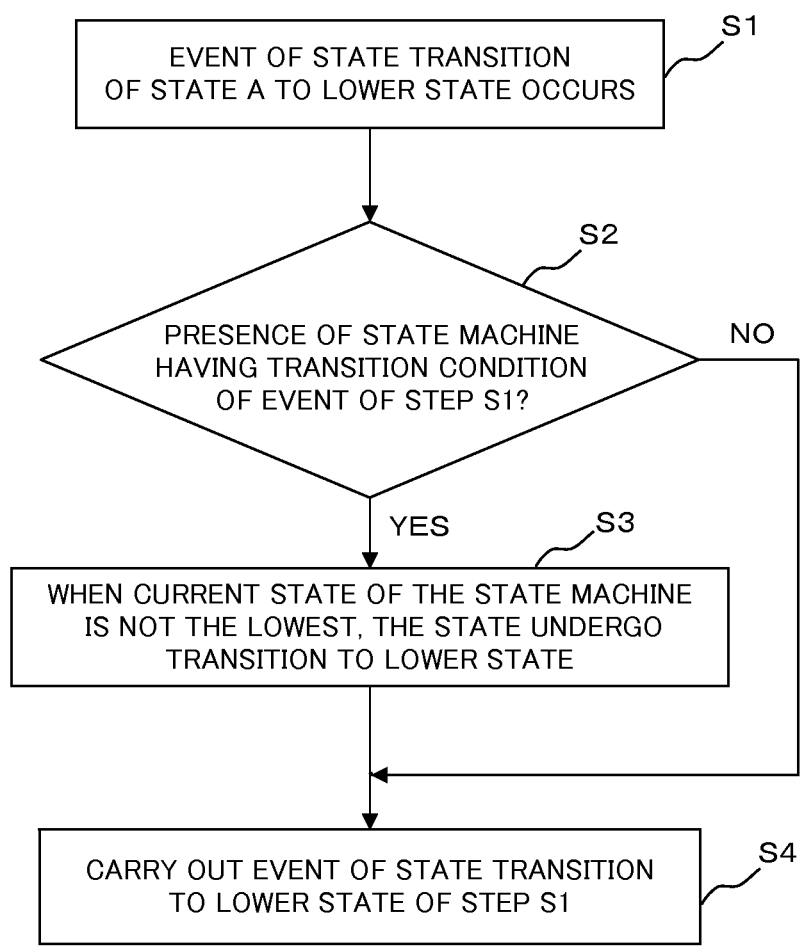
FIG. 6 is a flow diagram illustrating an example of operation of the communication system of FIG. 2.

As illustrated in FIG. 6, the packet processing engine 6 detects occurrence of an event of state transition of a certain state A of the compressor 1-A (2-A) or the decompressor 1-B (2-B) to a lower state (step S1). Here, an event of state transition of a certain state A to a lower state unit, for example, a normal transition of a header decompression state from FC state to SC state as illustrated in FIG. 5B.

Then, the packet processing engine 6 refers to various data stored in the memory 3 to judge the presence of a state machine having the state transition event of step S1 as the transition condition (step S2). Namely, a judgment is made on state transition contents of the occurrence of the state transition event of state A in the state machine association data/interlocking transition condition data. When the judgment concludes the presence (see YES route in step S2), an transition object to be set as the interlocking transition object is extracted. Conversely, when the judgment concludes the absence (see NO route in step S2), the procedure executes the event of a state transition of the state A to a lower state (see step S4).

For example, assuming that the event of a state transition of the state A to a lower state is a normal transition of a header decompression state of from FC state to SC state as illustrated in FIG. 5B, the interlocking transition of a header compression state of from SO state to FO state and of from FO state to IR state are extracted as interlocking transition object by the packet processing engine 6.

The packet processing engine 6 judges whether the current state in the state machine corresponding to the extracted interlocking transition object is the lowest state (IR state or NC state), and when judging that the current state is not the lowest, the transition object set to be the interlocking transition object undergoes a transition to a lower state (see step S3). When the current state is the lowest, interlocking transition is not carried out because there is not need for a transition.

For example, when the current state of a header compression state is SO state, an interlocking transition of from SO state to FO state is carried out.

Next, the packet processing engine 6 carries out the event of a state transition of state A to a lower state (see step S4). Here, the event of a state transition of the state A to a lower state is for the header decompression state of the decompressor 1-B (2-B) at the opposing station, the feedback information is transmitted to the compressor 2-A (1-A) concurrently with the execution of the event of the state transition to a lower state, so that the compressor 2-A (1-A) is also caused to execute an event of transition to a lower state.

The above operation of the communication system of the first embodiment makes the UE 1 and the eNB 2 possible to make a transition in the header compression state to one having a high possibility in succeeding in decoding at the opposing state in response to the state transition of the header decompression state of the decompression 1-B (2-B) in the same station even when the UE 1 and eNB 2 does not receive feedback information to cause state transition of the header compression state of the compressor 1-A (2-A) to a lower state (e.g., transition of from SO state to FO state).

Similarly, the UE 1 and eNB 2 can cause transition of the header decompression state of the decompressor 1-B (2-B) in response to a state transition in the header compression state of the compressor 1-A (2-A) in the same station. In addition, when the decompressor 1-B (2-B) transmits feedback information to cause a state transition to the compressor 2-A (1-A) at the opposing station in response to interlocking transition in the header decompression state, the compressor 2-A (1-A) at the opposing station can make transition in the header compression state to a proper state before the error rate exceeds the predetermined error rate.

In other words, when one of the state machines of the compressors 1-A and 2-A and the decompressors 1-B and 2-B included in the UE 1 and eNB 2 makes transition to a lower state, the communication system of the present embodiment can rapidly cause transition in the remaining state machine of the same and the opposing stations in response to the first transition, so that error tolerance and rapidness in response can be improved.

As described above, the present invention can reduce the period during which packet data having a compressed header cannot be normally restored, suppressing loss of packet data and improving the throughput of the communication system.

(4) First Modification

In the above embodiment, in response to an occurrence of a transition in one of the state machines of the compressors 1-A (2-A) and the decompressors 1-B (2-B) to a lower state, the other state machine in the same station (UE 1 or eNB 2) makes a transition thereof to a lower state. Alternatively, as the condition of an interlocking transition in header procession state of the above other state machine, the interlocking transition in the state may be based on the transition contents of the one state machine and the state of the other state machine before the transition. Namely, an interlocking transition may be carried out when the state transition contents and the interlocking state object satisfy particular conditions.

Figure 7A:
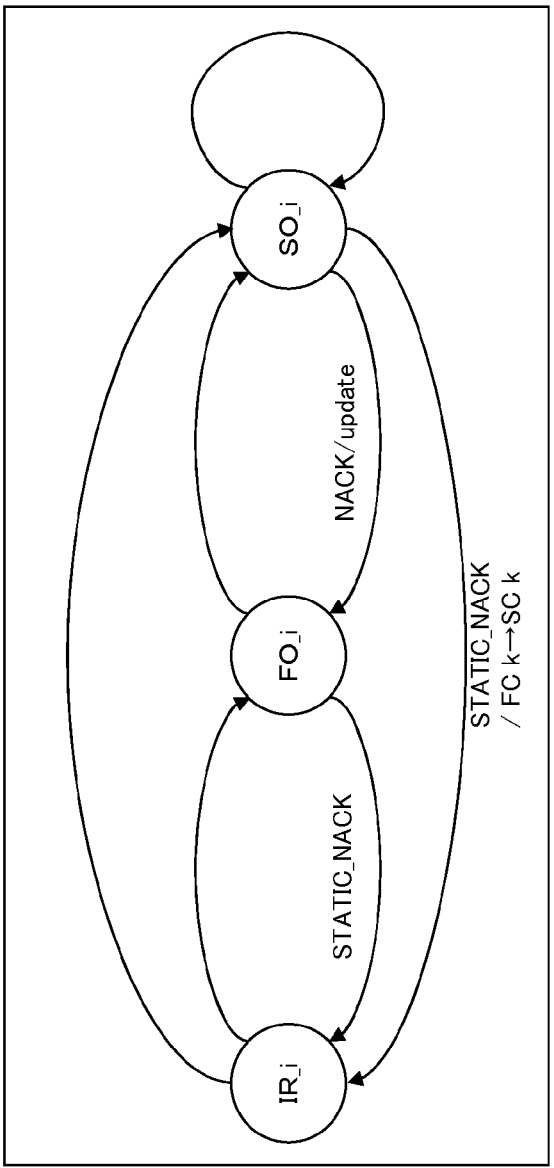
FIG. 7A is a diagram illustrating a state machine of a compressor of a first modification.

Description will now be made in relation to a method of controlling a state transition according to the first modification with reference to FIGS. 7A and 7B. FIG. 7A illustrates a state machine of a compressor of the first modification and FIG. 7B illustrates a state machine of a decompressor of the first modification.

As illustrated in FIG. 7A, in the communication system of the first modification, the header compression state of the transmitting packet flow "#i" of the compressor 1-A (2-A) being in SO state (SO_i) undergoes a normal transition when the compressor 1-A (2-A) is in the header compression state of SO state (SO_i) and receives a static negative acknowledgment, as the feedback information, from the decompressor at the opposing station. Further, when the header decompression state of the receiving packet flow "#k" of the decompressor 1-B (2-B) undergoes a normal transition of from FC state (FC_k) to SC state (SC_k), the header compression state undergoes an interlocking transition to the lower state of FO state (FO_i). In the remaining cases, the above interlocking transition is not carried out.

Specifically, the above first embodiment carries out an interlocking transition regardless of the state of the header compression state of the transmitting packet flow "#i" of the compressor 1-A (2-A) and state transition contents of the header decompression state of the receiving packet flow "#k" of the decompressor 1-B (2-B). In contrast, the first modification carries out an interlocking transition only when the state of the header compression state of the transmitting packet flow "#i" of the compressor 1-A (2-A) before the transition and state transition contents of the header decompression state of the receiving packet flow "#k" of the decompressor 1-B (2-B) satisfy predetermined conditions.

Figure 7B:
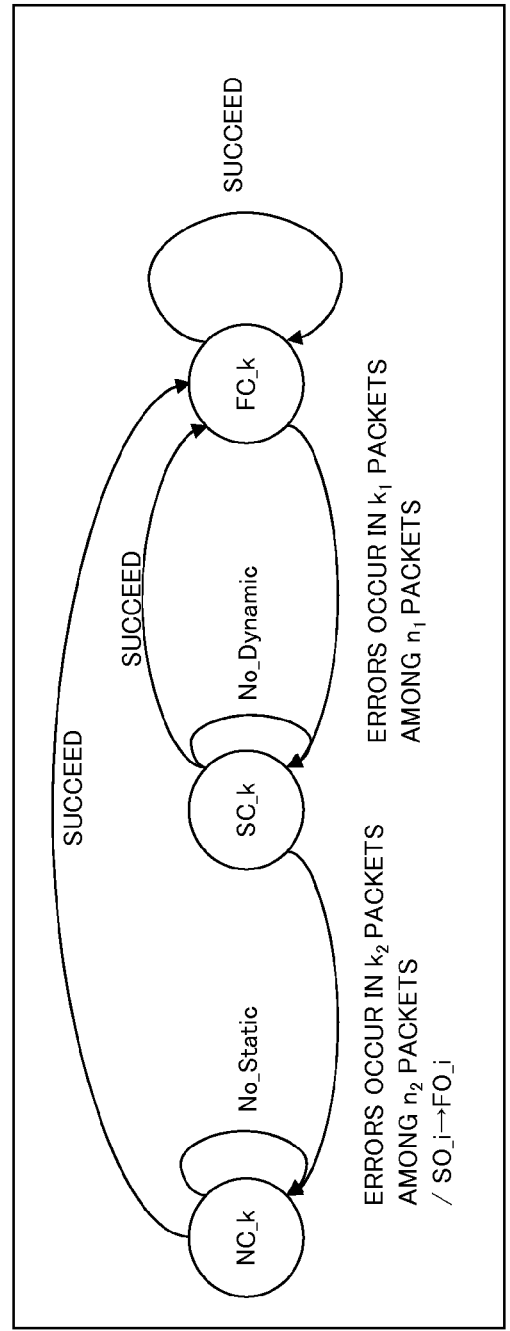
FIG. 7B is a diagram illustrating a state machine of a decompressor of the first modification.

Similarly, as illustrated in FIG. 7B, for example, the header decompression state of the receiving packet flow "#k" being in SC state (SC_k) undergoes a normal transition when $k_2$ packets in the $n_2$ packets received from the opposing station fails in header decompression (exceeding a predetermined error rate). In addition, when the header compressions state of the transmitting packet flow "#i" undergoes a normal transition of from SO state (SO_i) to FO state (FO_i) in response to the feedback information (NACK or update), the header decompression state is caused to undergo an interlocking transition to a lower state SC (SC_k). In the remaining cases, this interlocking transition is not carried out.

Description will now be made in relation to an example of operation of the communication system of the first modification with reference to FIG. 8.

As illustrated in FIG. 8, the packet processing engine 6 detects occurrence of an event of a state transition of a certain state A of the compressor 1-A (2-A) or the decompressor 1-B (2-B) to a lower state (step S10). Here, an event of a state transition of a certain state A to a lower state unit, for example, a normal transition of a header decompression state from FC state to SC state as illustrated in FIG. 7B.

Then, the packet processing engine 6 refers to various data stored in the memory 3 to judge the presence of a state machine having the state transition event of step S10 as the transition condition (step S20). Namely, a judgment is made on whether state transition contents of the occurrence of the state transition event of state A to a lower state is set in the state machine association data/interlocking transition condition data. When the judgment concludes the presence (see YES route in step S20), the transition object set as the interlocking transition object is extracted. Conversely, when the judgment concludes the absence (see NO route in step S20), the procedure executes the event of state transition of the state A to a lower state (see step S40).

For example, assuming that the event of state transition of the state A to a lower state is a normal transition of a header decompression state of from FC state to SC state as illustrated in FIG. 7B, the interlocking transition of a header compression state of from SO state to IR state of FIG. 7A is extracted as an interlocking transition object by the packet processing engine 6.

The packet processing engine 6 judges whether the state machine corresponding to the extracted interlocking transition object has an interlocking transition object related to the current state, and when judging that the state machine has no object related to the current state (No route in step S25), the procedure executes the event of state transition of the state A to a lower state (see step S40). On the other hand, when the packet processing engine 6 judges that the state machine has an object related to the current state (YES route in step S25), the transition object set to be the interlocking transition object is caused to undergo a transition to a lower state (see step S30).

For example, when the current state of a header compression state is SO state, an interlocking transition of from SO state to IR state is carried out as illustrated in FIG. 7A Next, the packet processing engine 6 carries out the event of the state transition of state A to a lower state (see step S40). Here, when the event of state transition of the state A to a lower state is for the header decompression state of the decompressor 1-B (2-B), the feedback information is transmitted to the compressor 2-A (1-A) concurrently with the execution of the event of the state transition to a lower state, so that the compressor 2-A (1-A) is also caused to execute an event of transition to a lower state.

The above operation of the communication system of the first modification can makes a more detailed interlocking transition through appropriately varying the state transition contents and the interlocking transition object in accordance with the quality that the bearer provides and the properties of the compression scheme.

Consequently, the first modification attains the same effects as those of the first embodiment, and additionally can avoid an excessive decline in header compression efficiency of the compressor 1-A (2-A) by adjusting a rate of performing the above interlocking transition.

(5) Second Modification

In the above first embodiment an interlocking transition is carried out in response to a state transition (normal transition) of the state machine of the compressor 1-A (2-A) or the decompressor 1-B (2-B). Alternatively, when a number of packet flows (transmitting packet flows or receiving packet flows) are multiplexed on the bearer between the UE 1 and the eNB 2, an interlocking transition of the header compression state of one of the transmitting packet flows of the compressor 1-A (2-A) may be carried out in accordance with a normal transition of header compression state of another one of the transmission packet flows of the compressor 1-A (2-A).

Similarly, an interlocking transition of the header decompression state of one of the receiving packet flows of the decompressor 1-B (2-B) may be carried out in accordance with a normal transition of header decompression state of another one of the transmission packet flows of the decompressor 1-B (2-B).

Specifically, for example, this transition is realized by setting both packet flow "#i" and "#k" to be transmitting packet flows or receiving packet flows in the state machine association data/interlocking transition condition data.

The operation of the communication system of the second embodiment can attain the same effects as those of the first embodiment also in two header compression states and two header decompression states of packet flows multiplexed in a bearer.

(6) Third Modification

In the above first embodiment, an interlocking transition is carried out on a state machine in accordance with a normal transition in another state machine. Alternatively, in cases where the compressor 1-A (2-A) or the decompressor 2-B (2-B) has two or more state machines, an interlocking transition may be carried out in accordance with the number of state transitions occurring in a number of state machines.

For example, when a number of packet flows (transmitting packet flows or receiving packet flows) are multiplexed in the bearer between the UE 1 and the eNB 2, the compressor 1-A (2-A) and decompressor 1-B (2-B) has two or more state machines.

Under this state, when the number (Nt, which is the natural number) of transition events to a lower state occurring in the state machines per predetermined time period exceeds a predetermined threshold (Nc, which is the natural number), communication environment between the UE 1 and the eNB 2 is judged to worsen and an interlocking transition of another state machine is carried out.

Figure 9:
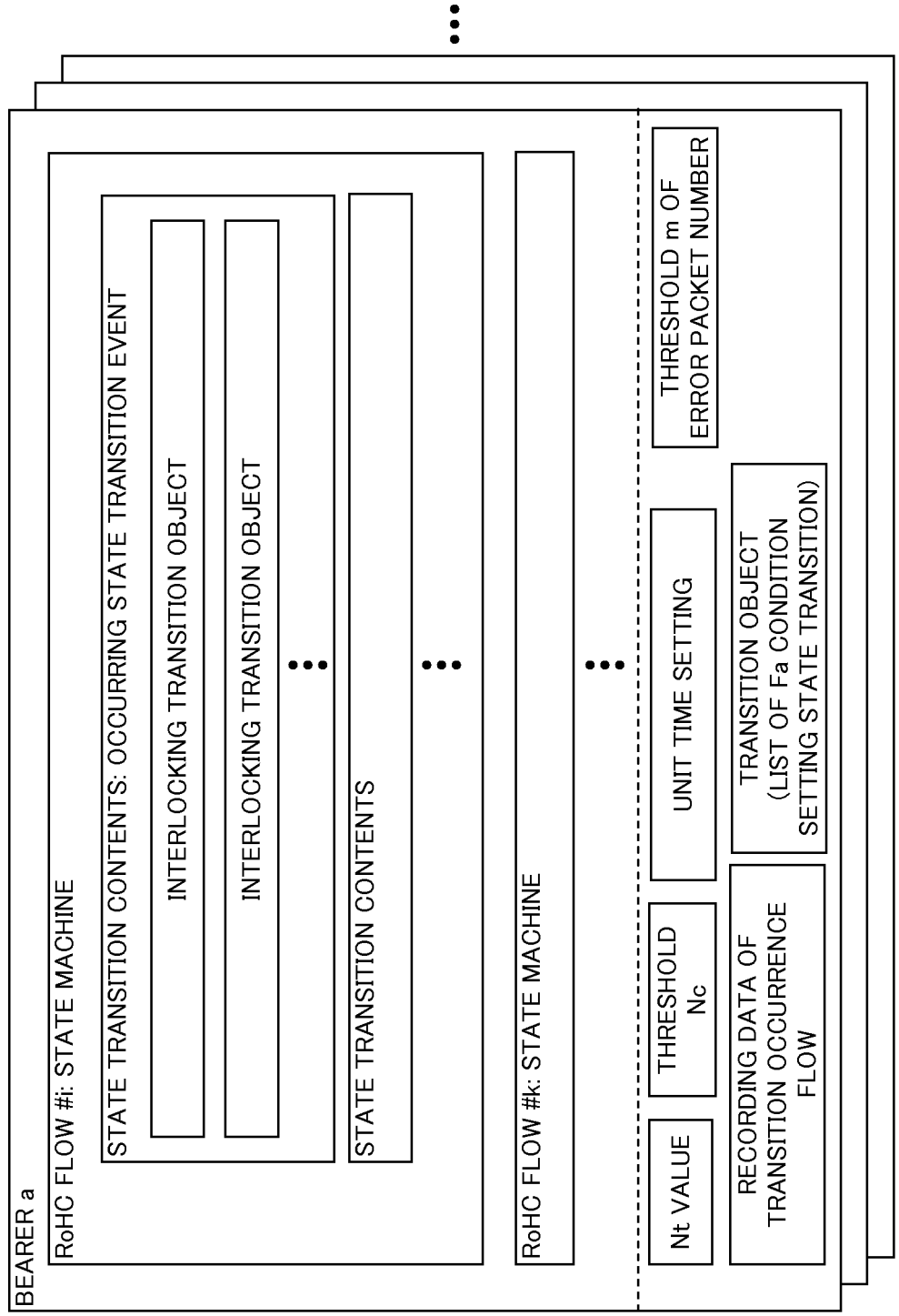
FIG. 9 is a diagram illustrating an example of state machine association data/interlocking transition condition data of a third modification.
Figure 10A:
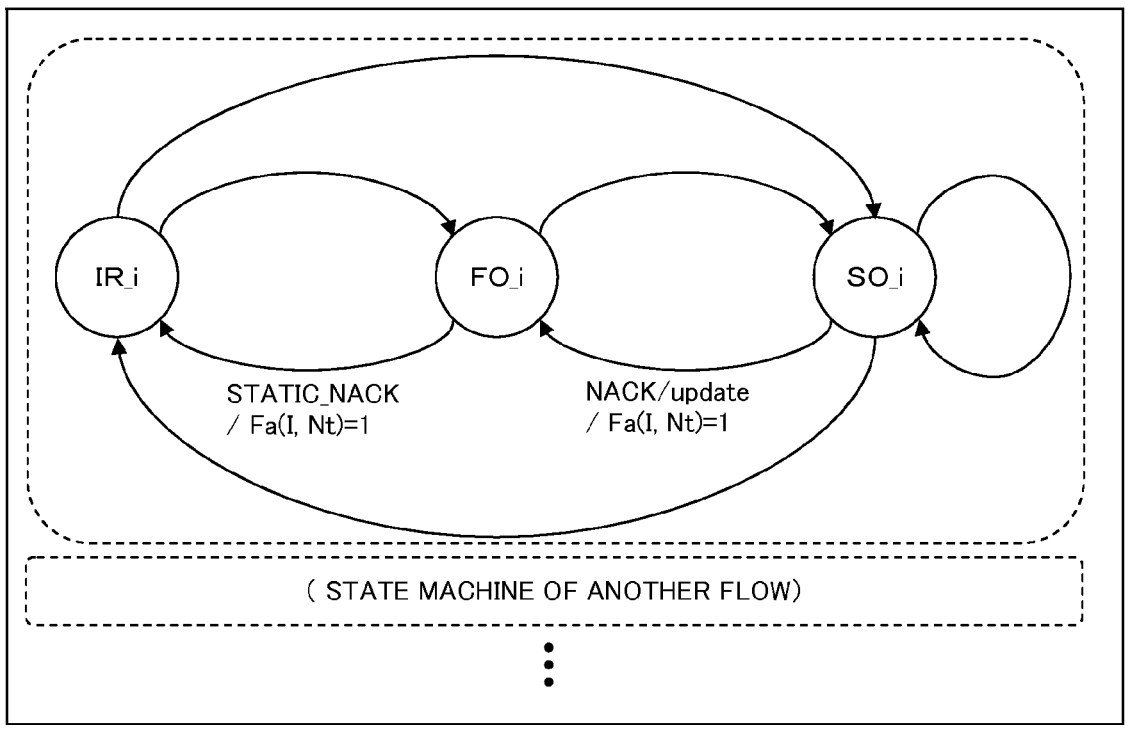
FIG. 10A is a diagram illustrating a state machine of a compressor of the third modification.
Figure 10B:
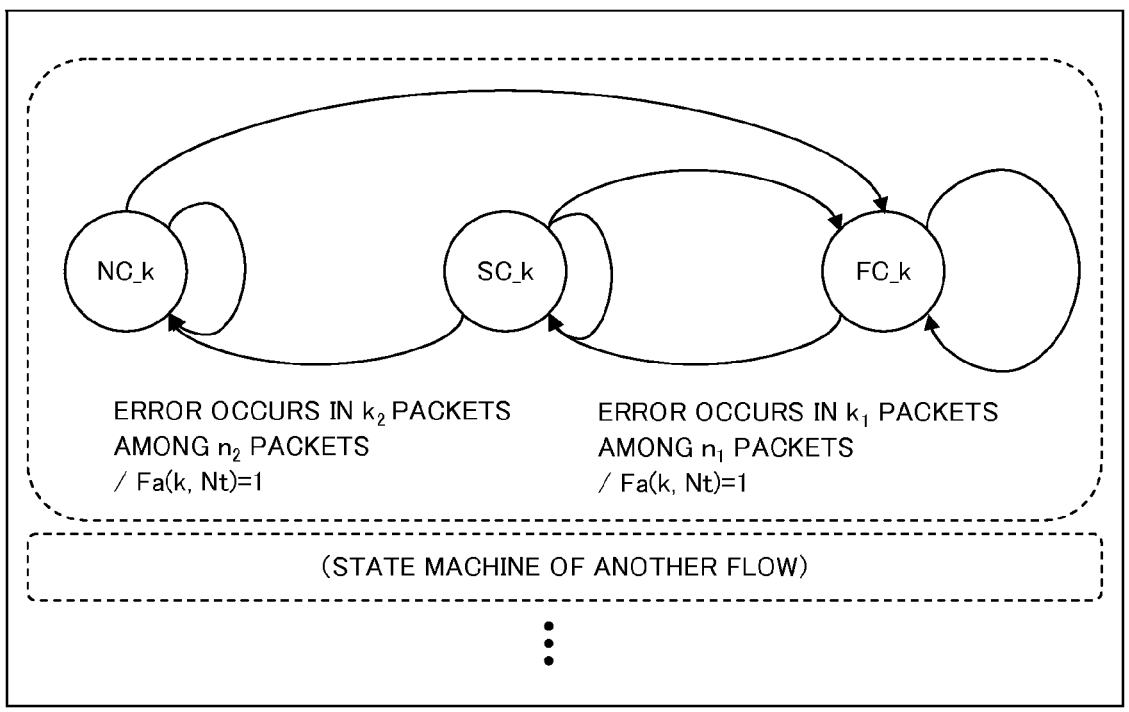
FIG. 10B is a diagram illustrating a state machine of a decompressor of the third modification.

Description will now be made in relation to an example of a method of controlling a state transition according to a third modification with reference to FIGS. 9, 10A, and 10B. FIG. 9 illustrates an example of state machine association data/interlocking transition condition data of the third modification. FIG. 10A is a state machine of the compressor of the third modification, and FIG. 10B is a state machine of the decompressor of the third modification.

As illustrated in FIG. 9, the state machine association data/interlocking transition condition data of the third modification includes the value Nt, the threshold Nc, unit time setting, error packet number threshold m, transition occurrence flow recording data, and transition object (list of Fa condition setting state transition).

In this modification, under the header compression state of the transmission packet flow "#i" being SO state (SO_i), as illustrated in FIG. 10A, when the compressor receives a negative acknowledgment (NACK) as feedback information from the decompressor at the opposing station or receives a request for updating context information, a normal transition is made. Further, when flag {Fa(i, Nt)}=1 is satisfied, the header compression state undergo an interlocking transition to a lower state FO state (FO_i).

The flag $Fa(i, Nt)$ is a transition condition (flag) of header compression state of transmitting packet flow "#i" on the bearer "a". The packet processing engine 6 manages and updates the flag $Fa(i, Nt)$ to be "1" when the Nt value (here, natural number) stored in, for example, state machine association data/interlocking transition condition data exceeds the threshold Nc (here, natural number) and to be "0" when the Nt value is the threshold Nc or less.

Here, the Nt value represents the number of transition event to a lower state occurring in a number of state machines on the bearer "a" during a predetermined time period set by unit time setting data and is managed and updated by, for example, the packet processing engine 6.

In the third modification, when the number Nt of normal transition events occurring in a number of state machines on the same bearer during a predetermined time period exceeds the threshold Nc, the flag is set to be "1", and an interlocking transition is carried out on a state of state machines having the flag as the condition of a transition.

Similarly, under the header compression state of the transmitting packet flow "#i" being FO state (FO_i), when the compressor receives a static negative acknowledgement as the feedback information from the decompressor at the opposing station, the compressor makes a normal transition of the header compression state. In addition, when $Fa(i, Nt)=1$ is satisfied, the header compression state is caused to undergo an interlocking transition to a lower state of IR state (IR_i).

In the meantime, under the header decompression state of the receiving packet flow "#k" being FC state (FC_k), when $k_1$ packets in the $n_1$ packets received from the opposing station fails in header decompression (exceeding a predetermined error rate) as illustrated in FIG. 10B, the decompressor makes a normal transition in the header decompression state thereof. Furthermore, when $Fa(k, Nt)=1$ is satisfied, the header decompression state is caused to undergo an interlocking transition to a lower state of SC state (SC_k).

Similarly, under the header decompression state of the receiving packet flow "#k" being SC state (SC_k), when $k_2$ packets in the $n_2$ packets received from the opposing station fails in header decompression (exceeding a predetermined error rate), the decompressor makes a normal transition in the header decompression state thereof. Furthermore, when $Fa(k, Nt)=1$ is satisfied, the header decompression state is caused to undergo an interlocking transition to a lower state of NC state (NC_k).

Specifically, for example, when the threshold Nc is "three" and when the three transmission packet flows "#1", "#2", and "#3" already undergo transitions to a lower state, the description here assumes that a normal transmission of from SO state to FO state occurs on the transmitting packet flow "#2".

At that time, the relationship $Nt>Nc$ is established and sets "1" in the flag. Then, a packet flow on the same bearer which is different from the transmitting packet flows "#1", "#3", "#0", and "#2" and which has a flag set to be an interlocking transition condition. In this modification, the receiving packet flow "#k" is selected, and is caused to undergo an interlocking transition of, for example, from FC state to SC state. This example describes an interlocking transition of a receiving packet flow carried out in accordance with the number of state transitions occurring in transmitting packet flows. Alternatively, in accordance with the number of state transitions occurring in transmitting packet flows, an interlocking transition may be made on another transmitting packet flow, or in accordance with the number of state transitions occurring in receiving packet flows, an interlocking transition may be made on a transmitting packet flow or on another receiving packet flow.

Description will now be made in relation to an example of operation of the system of the third modification with reference to FIG. 11.

Figure 11:
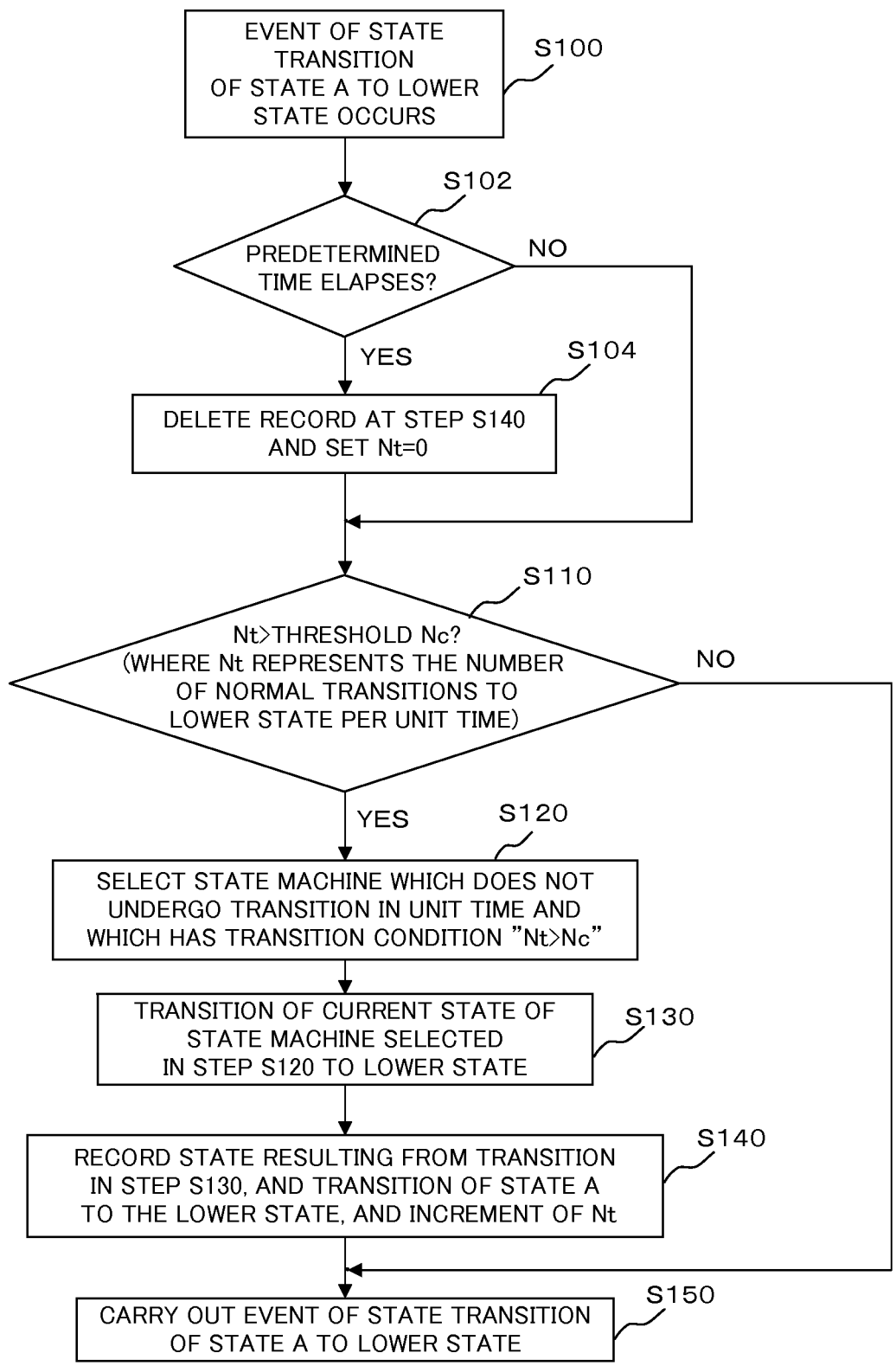
FIG. 11 is a flow diagram illustrating an example of operation of the communication system of the third modification.

As illustrated in FIG. 11, the packet processing engine 6 detects occurrence of an event of state transition of a certain state A of the compressor 1-A (2-A) or the decompressor 1-B (2-B) to a lower state (step S100). Here, an event of state transition of a certain state A to a lower state assumes, for example, to be a normal transition of a state machine of another flow to a lower state as illustrated in FIG. 10A.

The packet processing engine 6 refers to the unit time setting, to be used as a time period to observe the number Nt of state transition events occurring, in the state machine association data/interlocking transition condition data, and thereby judges whether a predetermined time elapses (step S102). Here, when judging that the predetermined time period elapses (YES route in step S102), the packet processing engine 6 deletes record of transition occurrence flow recording data to be detailed below, and substitutes "0" into the Nt value (step S104). This initiates the interlocking transition condition (relationship between the Nt values and the threshold Nc) at intervals of a predetermined time period, so that a ratio of performing the interlocking transition can be adjusted. Consequently, it is possible to avoid excessive lowering in compression efficiency of the header compression in the compression 1-A (2-A).

On the other hand, when judging that the predetermined time period does not elapse (NO route in step S102), the packet processing engine 6 carries out the procedure of step 110 and subsequent steps.

The packet processing engine 6 refers to various data stored in the memory 3 and judges whether the number Nt of normal transition events occurring to a lower state per unit time based on the unit time setting exceeds the threshold Nc (step S110). Here, when judging that $Nt>Nc$ is not established (NO route in step S110), the packet processing engine 6 sets "0" in the flag $Fa(i, Nt)$, and concurrently carries out a state transition event of the state A to a lower state (step S150).

Conversely, when judging that $Nt>Nc$ is established (YES route in step S110), the packet processing engine 6 sets "1" in the flag $Fa(i, Nt)$. The packet processing engine 6 then selects a state machine which has, as an interlocking transition condition, the flag $Fa(i, Nt)$ previously set in the list of Fa condition setting state transition and which does not undergo a state transition in the present unit time. Further, an interlocking transition object is selected from state machine having, as an interlocking transition condition, the flag $Fa(i, Nt)$ in round robin scheme (step S120).

For example, as illustrated in FIG. 10A, the state machine of transmitting packet flow "#i" is selected.

After that, the packet processing engine 6 makes an interlocking transition of the current state of the state machine selected in step S120 to a lower state (step S130).

For example, on the basis of the interlocking transition condition $\{Fa(i, Nt)\}$, an interlocking transition of from SO state to FO state or from FO state to IR state is carried out, as illustrated in FIG. 10A.

The packet processing engine 6 records the state after the interlocking transition at step S130 and the transition of state A to a lower state into the transition occurring flow recording data, and records the Nt value in increment of 1 to count the event occurrence of step S100 (step S140).

Then, the packet processing engine 6 carries out an event of the state transition of state A to a lower state (step S150).

The above operation of the communication system of this modification can attain the same effects as those of the first embodiment and the foregoing embodiments also in cases where the compressor 1-A (2-A) or the decompressor 1-B (2-B) has two or more state machines.

(4) Fourth Modification

In conjunction with the interlocking transition condition described in the foregoing example, a transition judging parameter (the number of error packets) defined in the RoHC protocol may be used.

For example, the interlocking transition of an interlocking transition object selected in the manner of the above third modification may be carried out when the number $k_1$ ($k_2$) of error packets detected by the decompressor 1-B (2-B) is the threshold m (natural number) of the error packet number or more; while the interlocking transition may not be carried out the number $k_1$ ($k_2$) is less than the threshold m.

An example of operation of the system of this modification will now be described with reference to FIG. 12.

Figure 12:
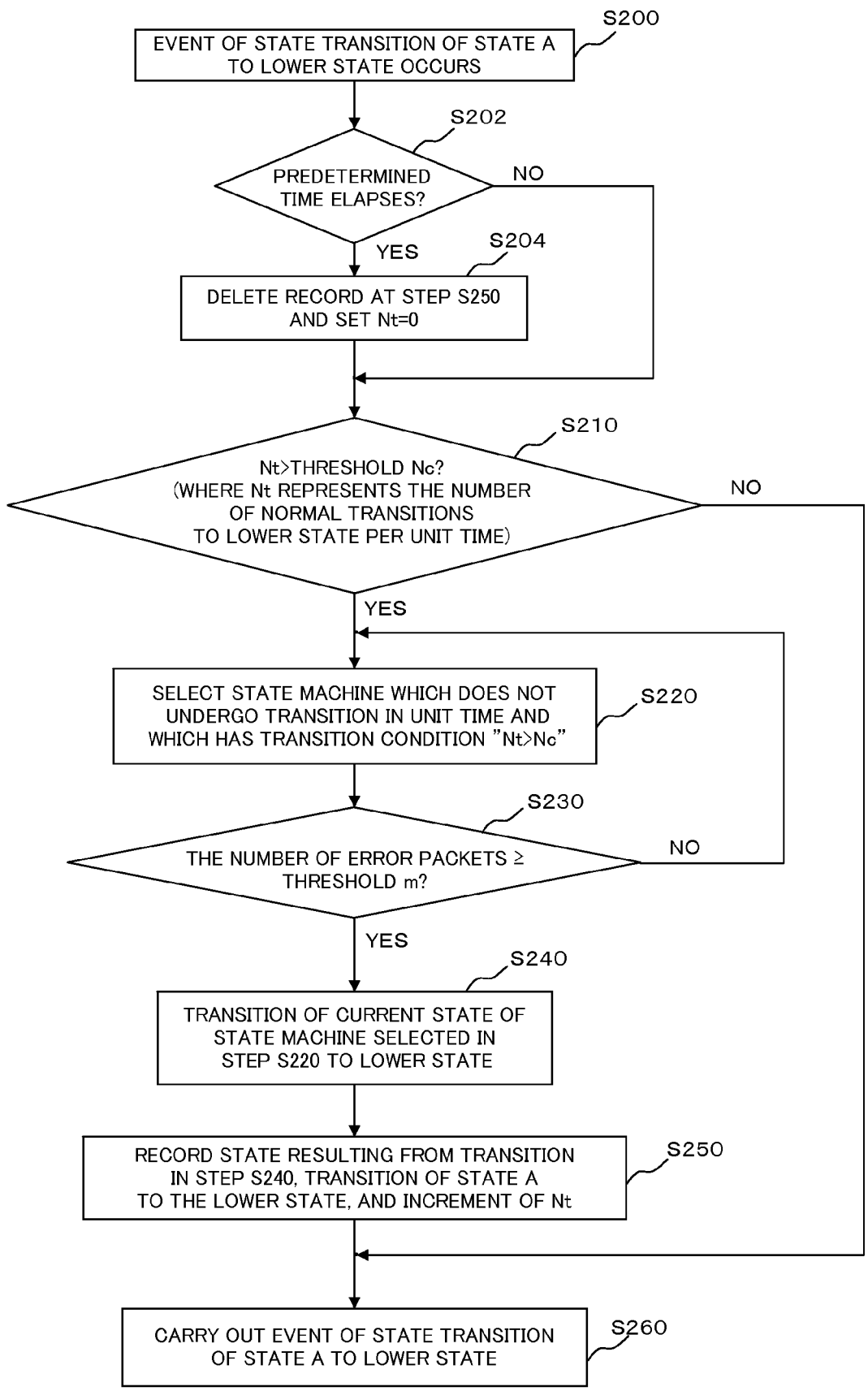
FIG. 12 is a flow diagram illustrating a method for controlling a state transition of a fourth modification.

As understood from FIG. 12, steps S200, S202, S204, S210, S220, and S240 through S260 are identical to S100, S102, S104, S110, S120, and S130 through S150 detailed above, respectively.

In the fourth modification, the packet processing engine 6 judges whether the number $k_1$ ($k_2$) of error packets of the state machine selected in step S220 is the threshold m of error packet number set in the state machine association data/interlocking transition condition data or more (step S230).

When judging that the number $k_1$ ($k_2$) of error packets is the threshold m or more (YES route in step S230), the interlocking transition of the corresponding state machine is carried out in step S240. Conversely, when judging that the number $k_1$ ($k_2$) is not the threshold m or more (NO route in step S230), the step S220 is carried out again without carrying out the interlocking transition on the state machine selected in step S220, so that the packet processing engine 6 retrieves a state machine which does not undergo transition during the corresponding unit time, which has a transition condition of "Nt>Nc", and which satisfies the condition for the error packet number of step S230.

Here, description is made on a case where the interlocking transition control in accordance with the number of error packets of the fourth embodiment is applied to the method of the third modification. Alternatively, the interlocking transition control of this modification may be applied to the first embodiment and the foregoing modifications.

For example, the first embodiment and the first through the third modifications can make a judgment on capability of interlocking transition control in accordance with the number of error packets of a packet flow selected as an interlocking transition object.

The operation of the communication system of this modification ensures the same effects as those of the first embodiment and the foregoing modifications and can control the ratio of performing an interlocking transition in further detail. Consequently, it is possible to avoid an excessive decline in header compression efficiency of the compressor 1-A (2-A).

(8) Others

The above examples are described mainly focusing on a transition to a lower state. In addition, an interlocking transition to an upper state can be controlled similarly to the disclosure.

The header compression and the header decompression described in the above examples are assumed to conform to RoHC. Alternatively, the present invention can be applied to general header compressing/decompressing techniques can be applied to the present invention.

Further, the examples use the present invention in conjunction with transition control based on the feedback information from the opposing station. Alternatively, the present invention can be carried out without transition control based on the feedback information.

The above examples assume that an interlocking transition control is carried out on a UE 1 and an eNB 2 serving as entities of a 3GPP mobile communication. Additionally, the present invention can carry out interlocking transition on other entities that compress and restore packet headers.

According to the above embodiments, it is possible to shorten the period in which packet data having a compressed header cannot be normally restored, so that the resultant suppression of losing packet data can improve the throughput of the communication system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A packet communication apparatus that carries out packet communication with a second packet communication apparatus via a logical connection through header processing of compressing or decompressing a packet header, the packet communication apparatus comprising:
   a state machine manager that manages a first state machine of a first header processing state concerning a first packet flow of the connection and a second state machine of a second header processing state concerning a second packet flow of the connection; and
   a controller that controls a state transition of a third state machine that is one of the first state machine and the second state machine on the basis of a state transition of a fourth state machine that is the other of the first state machine and the second state machine, wherein
   the controller is further configured that, in the case that the state transition of the fourth state machine is carried out, carries out the state transition of the third state machine when a predetermined condition is satisfied and does not carry out the state transition of the third state machine when the condition is not satisfied.

2. The packet communication apparatus according to claim 1, wherein:
   the first packet flow is a transmitting packet flow;
   the first header processing state is a header compression state;
   the second packet flow is a receiving packet flow; and
   the second header processing state is a header decompression state.

3. The packet communication apparatus according to claim 1, wherein:
   the first packet flow and the second packet flow are each receiving packet flow; and
   the first header processing state and the second header processing state are each header decompression state.

4. The packet communication apparatus according to claim 1, wherein:

the first packet flow and the second packet flow are each transmitting packet flow; and the first header processing state and the second header processing state are each header compression state.

5. The packet communication apparatus according to claim 1, wherein:

when there are two or more of the fourth state machines and when the number of the fourth state machines in each of which a particular state transition occurs exceeds a predetermined number, the controller judges a capability of the controlling; and when the controller is capable of the controlling, the controller carries out the state transition of the third state machine.

6. The packet communication apparatus according to claim 5, wherein, when there are two or more of the third state machines, the controller selects one of the third state machines as one on which the judging is to be made.

7. The packet communication apparatus according to claim 1, wherein a condition of the state transmission of the header processing state of the third state machine comprises a kind of the state transition state of the header processing state of the fourth state machine and a kind of state of the header processing state of the third state machine.

8. The packet communication apparatus according to claim 1, wherein a condition of the state transmission of the header processing state of the third state machine comprises a transition judging parameter defined by a protocol of the header processing.

9. The packet communication apparatus according to claim 1, wherein the header processing is Robust Header Compression (RoHC) processing.

10. A method for packet communication between packet communication apparatuses coupled via a logical connection through header processing of compressing or decompressing a packet header, the method comprising:

managing a first state machine of a first header processing state concerning a first packet flow of the connection and a second state machine of a second header processing state concerning a second packet flow of the connection; and controlling a state transition of a third state machine that is one of the first state machine and the second state machine on the basis of a state transition of a fourth state machine that is the other of the first state machine and the second state machine, wherein in the controlling, in the case that the state transition of the fourth state machine is carried out, carrying out the state transition of the third state machine when a predetermined condition is satisfied and not carrying out the state transition of the third state machine when the condition is not satisfied.

11. The method according to claim 10, wherein:

the first packet flow is a transmitting packet flow;

the first header processing state is a header compression state;

the second packet flow is a receiving packet flow; and the second header processing state is a header decompression state.

* * * * *